(12) United States Patent
Takeuchi et al.

(10) Patent No.: US 9,678,595 B2
(45) Date of Patent: *Jun. 13, 2017

(54) TOUCH SENSOR, DISPLAY DEVICE, AND ELECTRONIC APPARATUS

(71) Applicant: Japan Display Inc., Tokyo (JP)

(72) Inventors: Takeya Takeuchi, Aichi (JP); Koji Noguchi, Kanagawa (JP); Koji Ishizaki, Aichi (JP); Takayuki Nakanishi, Aichi (JP); Yasuyuki Teranishi, Aichi (JP)

(73) Assignee: Japan Display Inc., Tokyo (JP)

( * ) Notice: Subject to any disclaimer, the term of this patent is extended or adjusted under 35 U.S.C. 154(b) by 337 days.

This patent is subject to a terminal disclaimer.

(21) Appl. No.: 14/484,776

(22) Filed: Sep. 12, 2014

(65) Prior Publication Data

US 2015/0002466 A1    Jan. 1, 2015

Related U.S. Application Data

(63) Continuation of application No. 12/662,976, filed on May 13, 2010, now Pat. No. 8,860,685.

(30) Foreign Application Priority Data

May 26, 2009    (JP) .................................. 2009-126487

(51) Int. Cl.
   *G06F 3/041*    (2006.01)
   *G06F 3/044*    (2006.01)
   *G06F 1/16*    (2006.01)

(52) U.S. Cl.
   CPC .......... *G06F 3/0416* (2013.01); *G06F 1/1643* (2013.01); *G06F 3/044* (2013.01); *G06F 3/0412* (2013.01); *G06F 3/0418* (2013.01)

(58) Field of Classification Search
   CPC .... G06F 1/1643; G06F 3/0412; G06F 3/0418; G06F 3/044; G06F 3/0416; G06F 3/0488
   USPC .............................. 178/18.06; 345/173, 174
   See application file for complete search history.

(56) References Cited

U.S. PATENT DOCUMENTS

| 4,293,734 | A  | 10/1981 | Pepper, Jr. |
| 5,633,659 | A  | 5/1997 | Furuhashi et al. |
| 6,057,903 | A  | 5/2000 | Colgan et al. |
| 2004/0217945 | A1 | 11/2004 | Miyamoto et al. |
| 2006/0097991 | A1 | 5/2006 | Hotelling et al. |

(Continued)

FOREIGN PATENT DOCUMENTS

| JP | 56-500230 T | 2/1981 |
| JP | 2008-009750 | 1/2008 |

*Primary Examiner* — Amr Awad
*Assistant Examiner* — Aaron Midkiff
(74) *Attorney, Agent, or Firm* — Michael Best & Friedrich LLP

(57) ABSTRACT

A touch sensor includes a sensor electrode having an electrostatic capacitance for touch detection, and a touch detection circuit detecting a contact or proximity position of an object on the basis of a detection signal obtained from the sensor electrode by applying a touch sensor drive signal to the sensor electrode. The sensor electrode is split into plural stripe-like electrode patterns. Applying the touch sensor drive signal to part of the electrode patterns forms a drive line at that time. The touch detection circuit performs a detection on the basis of a first detection signal obtained from a first drive line formed in a first period, and a second detection signal obtained from a second drive line formed in a second period.

20 Claims, 26 Drawing Sheets

(56) References Cited

U.S. PATENT DOCUMENTS

2007/0262966 A1 11/2007 Nishimura et al.
2008/0259051 A1 10/2008 Ota

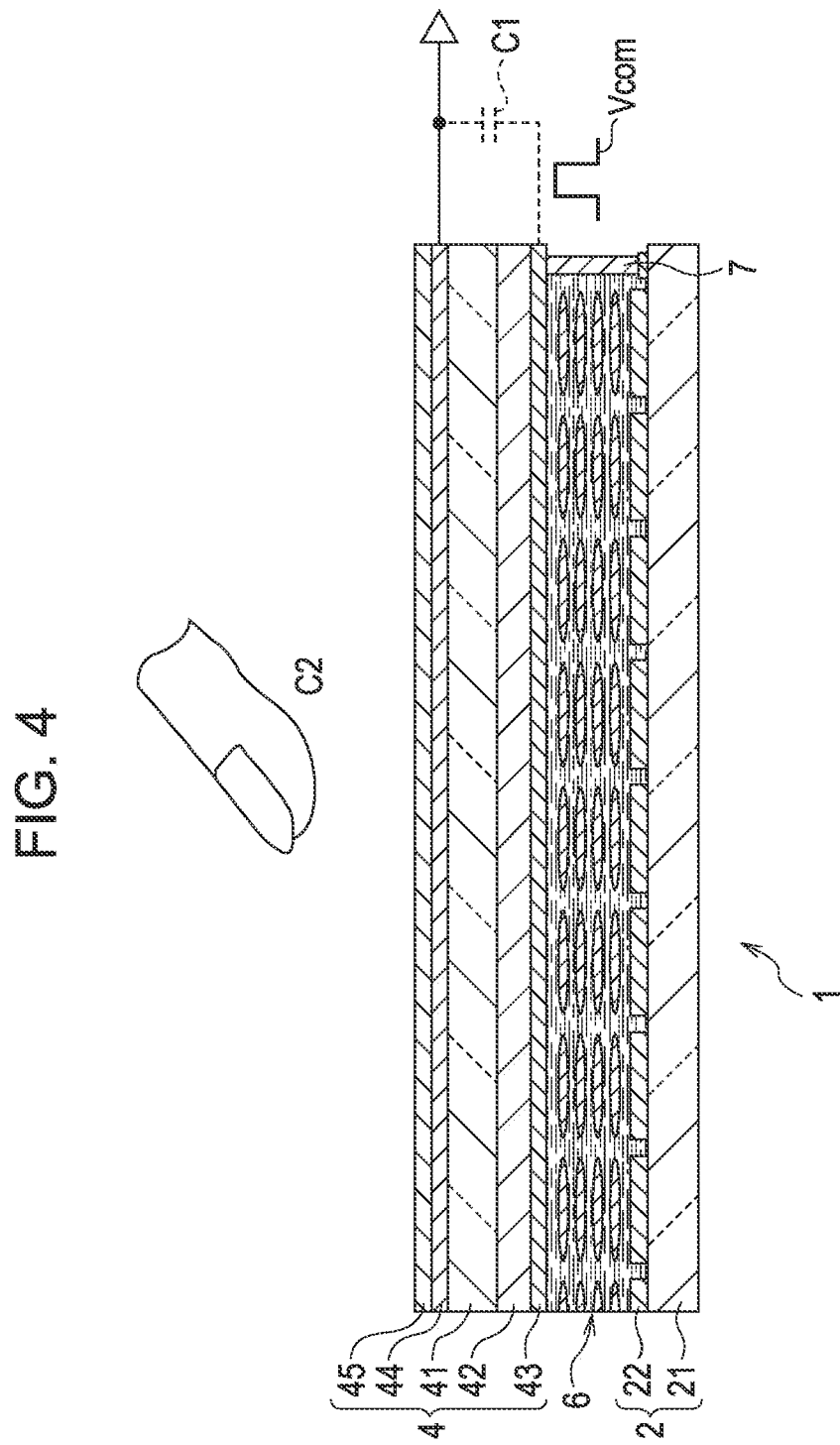

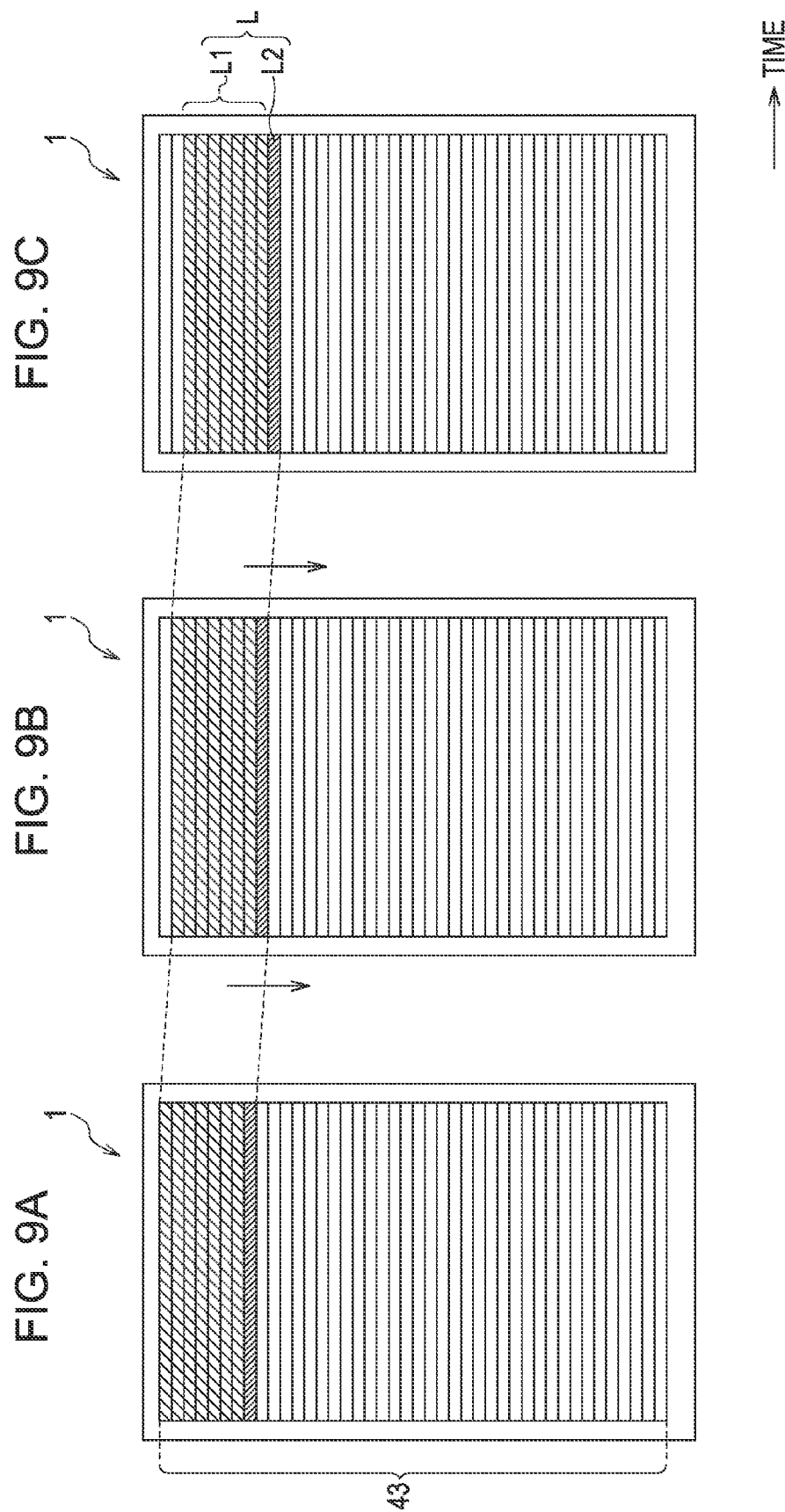

DETECTION WAVEFORM (Vdet)

DETECTION WAVEFORM (Vdet: WHEN WRITING WHITE)

DETECTION WAVEFORM (Vdet: WHEN WRITING BLACK)

INVERSION WAVEFORM OF Vcom

PIXEL SIGNAL WAVEFORM WHEN WRITING WHITE

PIXEL SIGNAL WAVEFORM WHEN WRITING BLACK

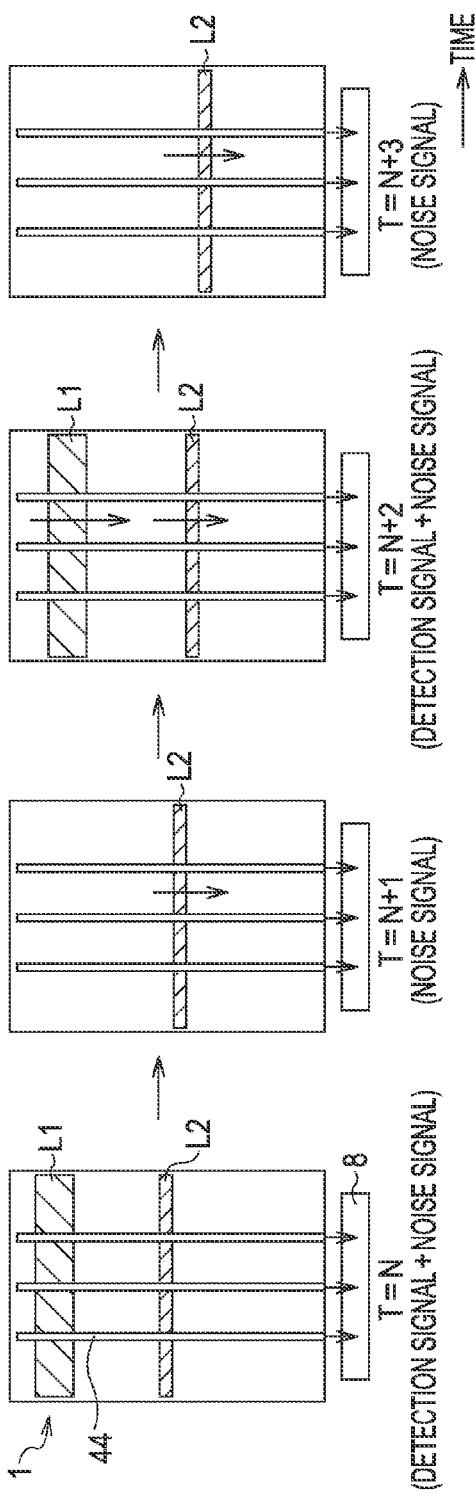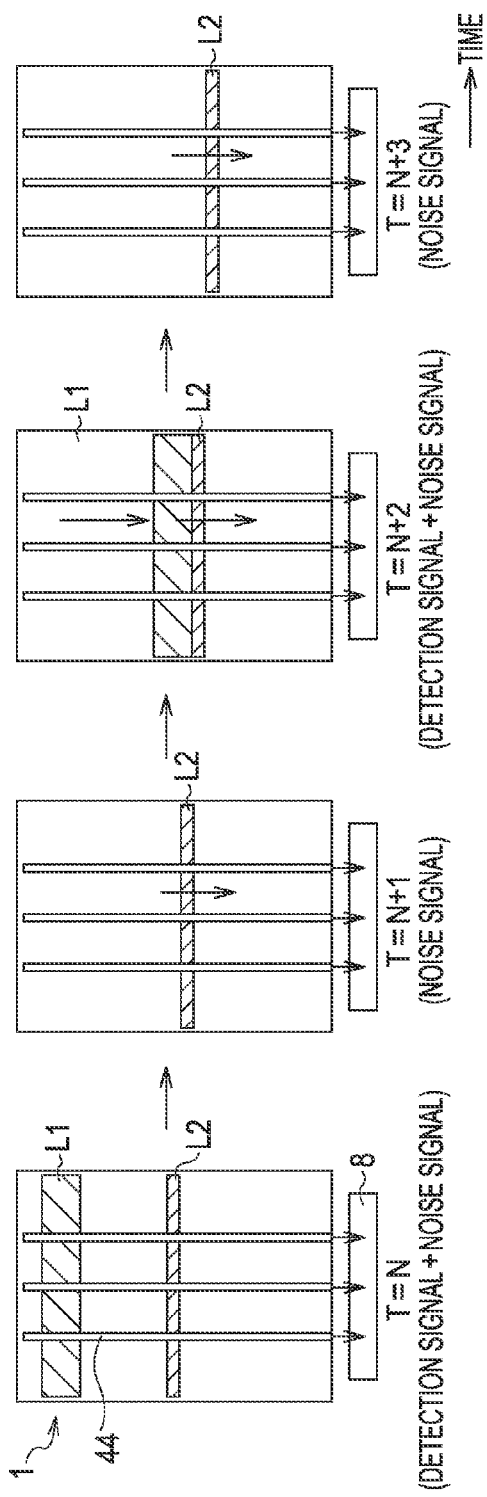

Vcom WAVEFORM

DETECTION WAVEFORM (Vdet_a)

Vcom WAVEFORM

DETECTION WAVEFORM (Vdet_b)

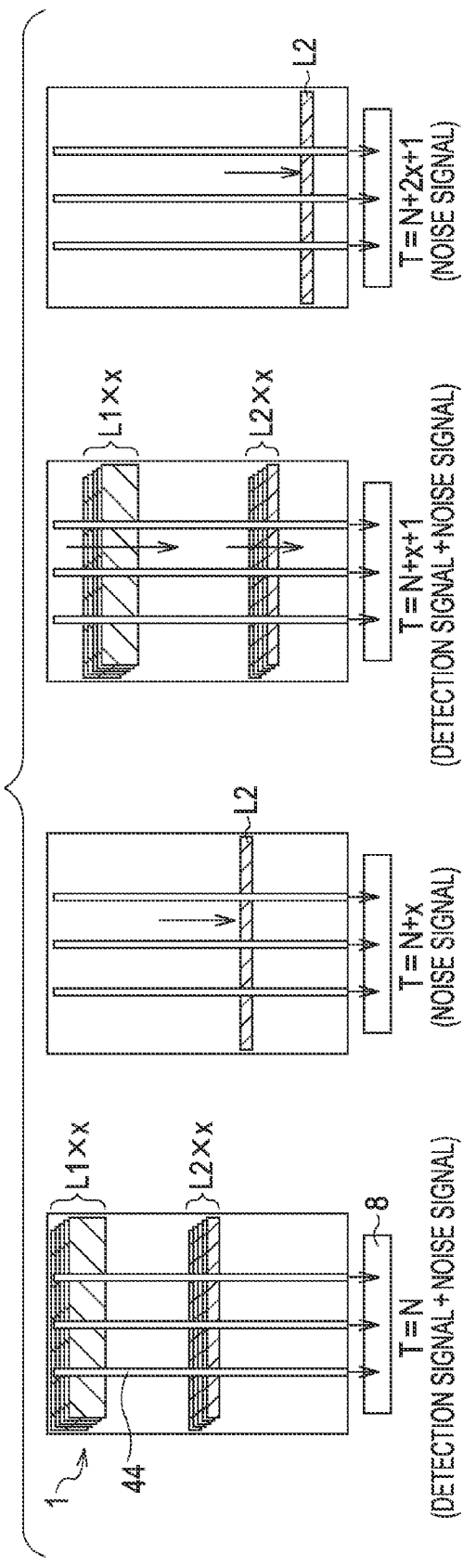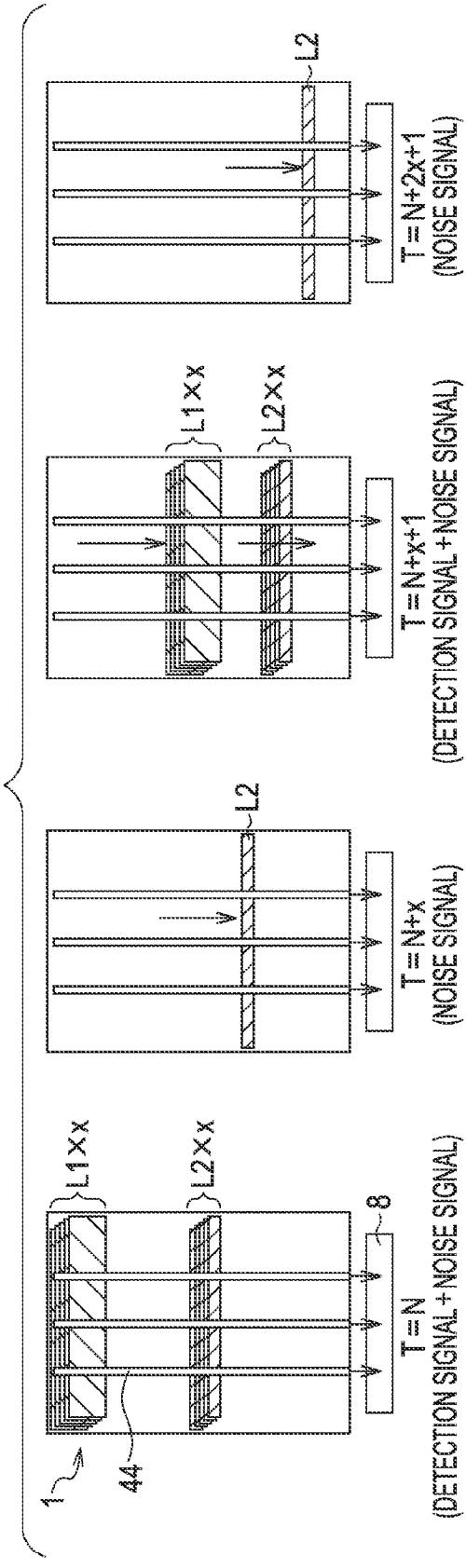

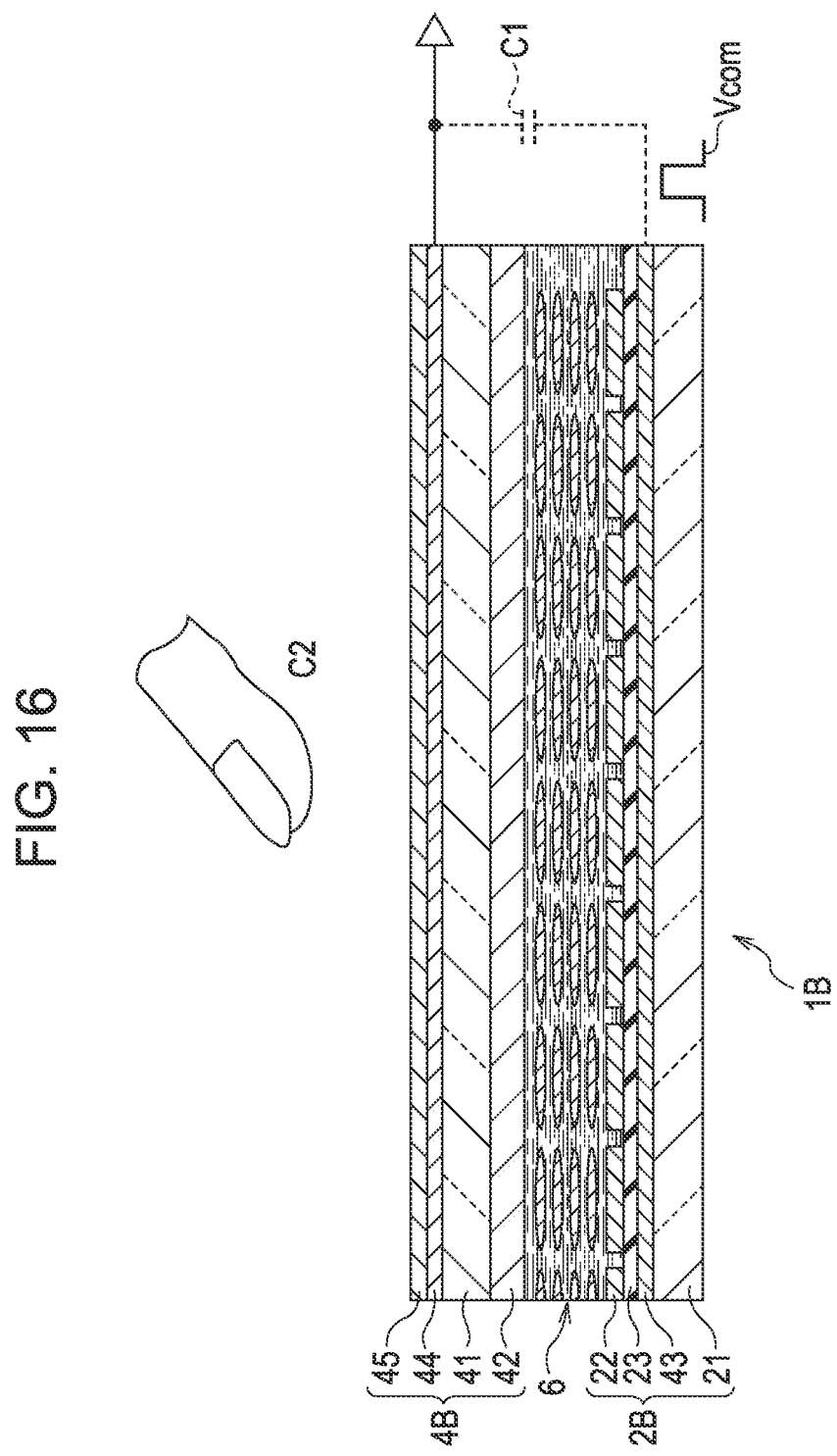

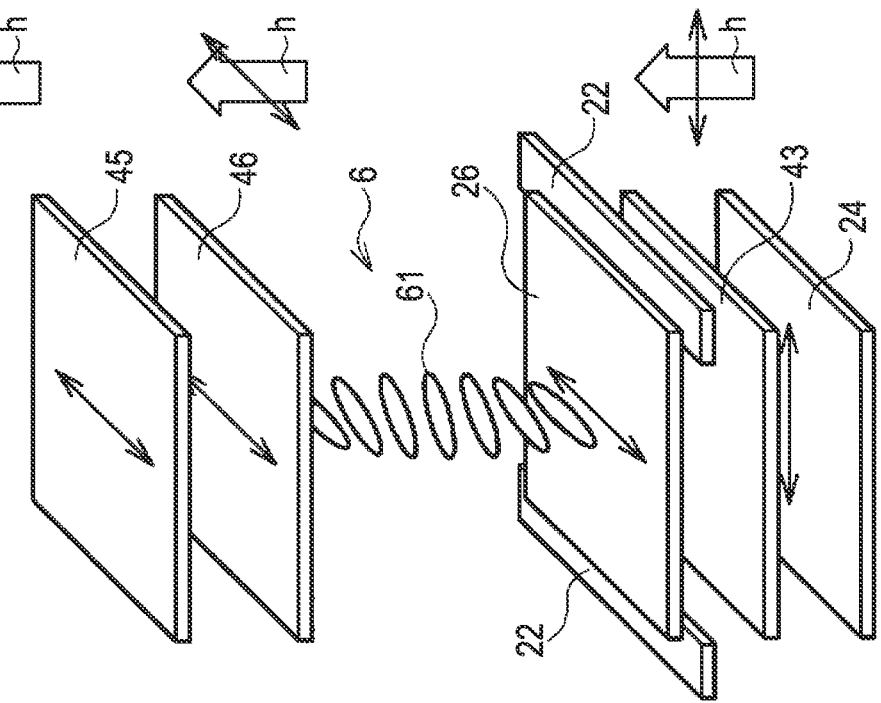
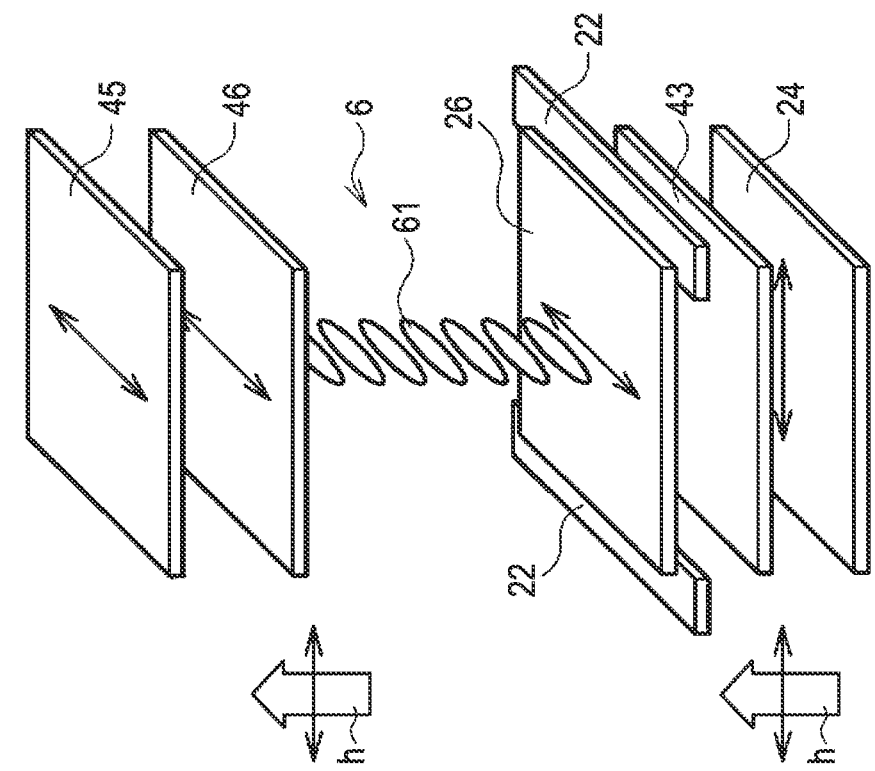

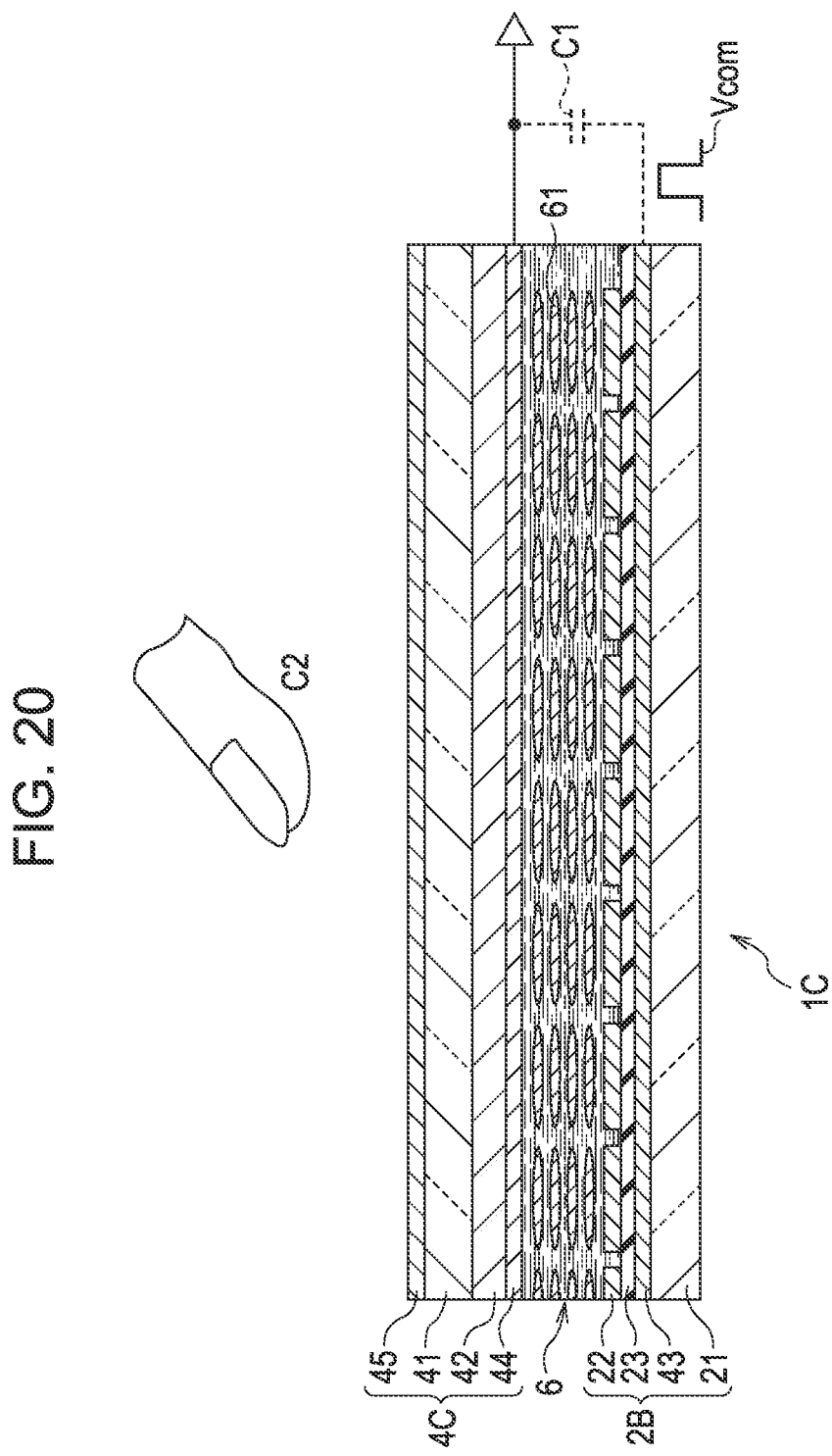

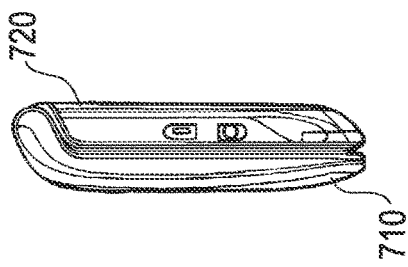
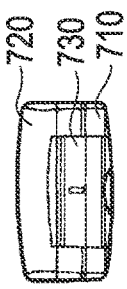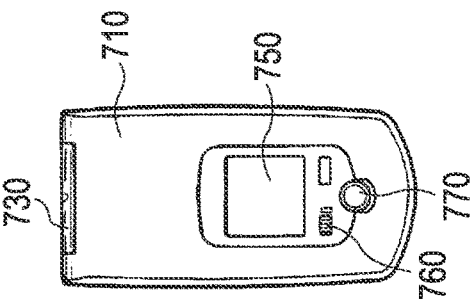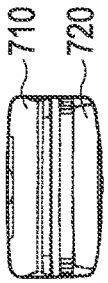
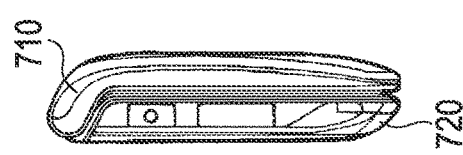
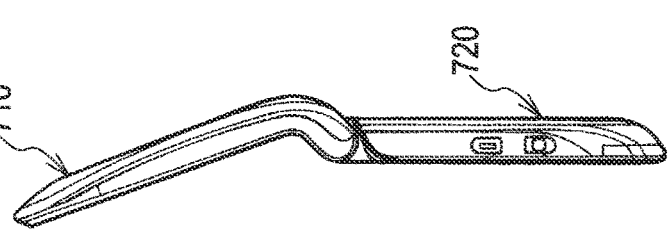
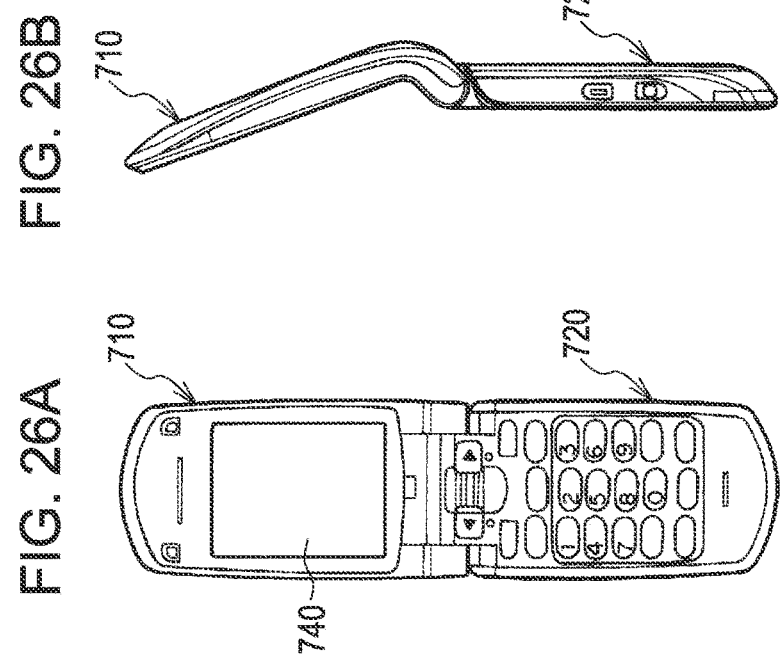

TOUCH SENSOR, DISPLAY DEVICE, AND ELECTRONIC APPARATUS

CROSS REFERENCES TO RELATED APPLICATIONS

The present application is a Continuation of application Ser. No. 12/662,976, filed May 13, 2010, which claims priority to Japanese Patent Application JP 2009-126487 filed in the Japanese Patent Office on May 26, 2009. The entire contents of these applications are incorporated herein by reference.

BACKGROUND OF THE INVENTION

1. Field of the Invention

The present invention relates to a display device such as a liquid crystal display device, in particular, a capacitive touch sensor that allows a user to input information by bringing a finger or the like into contact with or proximity to the touch sensor, and a display device and an electronic apparatus including such a touch sensor.

2. Description of the Related Art

Recently, attention has been paid to a type of display device which has a contact detecting device (hereinafter, referred to as touch sensor) or a so-called touch panel directly mounted on a liquid crystal display device, and in which various buttons are displayed on the liquid crystal display device instead of ordinary buttons to allow input of information. Since this technology enables shared placement of the display and buttons amid the growing tendency toward larger screen sizes of mobile apparatus, the technology provides significant advantages such as space saving and reduced number of parts. However, this technology has a problem in that the overall thickness of the liquid crystal module increases due to the mounting of the touch sensor. In particular, in mobile apparatus applications, a protective layer is necessary for protecting the touch sensor from scratches. Thus, the liquid crystal module tends to become increasingly thicker, which goes against the trend toward reduced thickness.

Accordingly, for example, Japanese Unexamined Patent Application Publication No. 2008-9750 and U.S. Pat. No. 6,057,903 each propose a liquid crystal display element with a touch sensor in which a capacitive touch sensor is formed, thus achieving reduced thickness. In this liquid crystal display element with a touch sensor, a conductive film for touch sensor is provided between the observation-side substrate of the liquid crystal display element, and a polarizing plate for observation arranged on the outer surface thereof, and a capacitive touch sensor is formed between the conductive film for touch sensor, and the outer surface of the polarizing plate, with the outer surface of the polarizing plate serving as a touch surface. In addition, for example, Japanese Unexamined Patent Application Publication (Translation of PCT Application) No. 56-500230 proposes a structure in which a touch sensor is built in a display device.

SUMMARY OF THE INVENTION

However, in the liquid crystal display element with a touch sensor disclosed in each of Japanese Unexamined Patent Application Publication No. 2008-9750 and U.S. Pat. No. 6,057,903, in principle, it is necessary that the conductive film for touch sensor be set at the same potential as that of the user, and thus it is necessary that the user be properly grounded. Therefore, aside from stationary television receivers which draw power from a socket, realistically, it is difficult to use such a liquid crystal device display element for mobile apparatus applications. In addition, according to the technique mentioned above, since it is necessary that the conductive film for touch sensor be located very close to the user's finger, there are limits to the location where the conductive film can be disposed, such that it is not possible to dispose the conductive film in a deeper portion of the liquid crystal display element, for example. That is, the degree of freedom of design is small. Further, the configuration according to the above-mentioned technique makes it necessary to provide circuit portions such as a touch sensor drive portion and a coordinate detecting portion separately from a display drive circuit portion for the liquid crystal display element, making it difficult to achieve circuit integration for the apparatus as a whole.

Accordingly, a conceivable solution would be to provide, in addition to a common electrode originally provided for applying a display drive voltage, a touch detection electrode that forms an electrostatic capacitance between the common electrode and the touch detection electrode (a display device including a capacitive touch sensor of a novel structure). That is, since this electrostatic capacitance changes depending on the presence/absence of contact or proximity of an object, if a display drive voltage applied to the common electrode by a display control circuit is also used (doubled) as a touch sensor drive signal, a detection signal responsive to a change in electrostatic capacitance is obtained from the touch detection electrode. Then, if this detection signal is inputted to a predetermined touch detection circuit, it is possible to detect the presence/absence of contact or proximity of an object. In addition, according to this technique, it is possible to obtain a display device with a touch sensor which can be even adapted for mobile apparatus applications in which the electric potential on the user side is often inconstant. Further, there are also advantages in that it is possible to obtain a display device with a touch sensor having a high degree of design freedom in accordance with the type of display function layer, and integration of circuits for display and circuits for sensor on a single circuit board is also facilitated, allowing for easy circuit integration.

The problem with capacitive touch sensors, including those according to Japanese Unexamined Patent Application Publication No. 2008-9750, U.S. Pat. No. 6,057,903, and Japanese Unexamined Patent Application Publication (Translation of PCT Application) No. 56-500230 mentioned above, and the above-mentioned novel structure, is that when writing a pixel signal (image signal) to the display element at each pixel, noise (internal noise) resulting from the writing operation is added to the detection signal.

Accordingly, to prevent erroneous operation (erroneous detection) due to noise resulting from the image signal writing operation, according to U.S. Pat. No. 6,057,903 and Japanese Unexamined Patent Application Publication (Translation of PCT Application) No. 56-500230 mentioned above, a transparent conductive layer (shield layer) is provided between the touch sensor and the display element. Then, by fixing this conductive layer to a constant potential, it is possible to shield against the above-mentioned noise from the display element.

However, this technique has a problem in that since a large capacitance is formed between the detection signal wire and the shield layer, the detection signal obtained from the detection signal wire is significantly attenuated, or the capacitance on the drive wire becomes so large that power consumption significantly increases. In addition, as in Japanese Unexamined Patent Application Publication (Translation of PCT Application) No. 56-500230 mentioned above, in the case where a detection signal for touch sensor is generated by using a part of the display drive circuit, when a shield layer is arranged between the display element and the detection electrode, the detection signal is also shielded out, making it difficult to perform a detection.

Further, as described above, the display device including a capacitive touch sensor according to the above-mentioned novel structure detects a position by using a write waveform in the display panel. For this reason, from the viewpoint of aperture ratio and manufacturing process, it is considered difficult to remove noise resulting from an image signal writing operation by providing a shield layer within the effective display area.

As described above, in the case of capacitive touch sensors, it is difficult to improve the accuracy of object detection by removing noise (internal noise) resulting from an image signal writing operation without using a shield layer, for example.

It is desirable to provide a capacitive touch sensor that makes it possible to improve the accuracy of object detection, and a display device and an electronic apparatus including such a touch sensor.

A touch sensor according to one embodiment includes a sensor electrode having an electrostatic capacitance for touch detection, and a touch detection circuit detecting a contact or proximity position of an object on the basis of a detection signal obtained from the sensor electrode by applying a touch sensor drive signal to the sensor electrode. The sensor electrode is split into plural stripe-like electrode patterns. Applying the touch sensor drive signal to part of the electrode patterns forms a drive line at that time. The touch detection circuit performs a detection on the basis of a first detection signal obtained from a first drive line formed in a first period, and a second detection signal obtained from a second drive line formed in a second period.

A touch sensor according to another embodiment includes a touch drive electrode, a touch detection electrode provided in opposition to or side by side with the touch drive electrode and forming an electrostatic capacitance between the touch detection electrode and the touch drive electrode, and a touch detection circuit that performs a detection of a contact or proximity position of an object, on the basis of a detection signal obtained from the touch detection electrode by applying a touch sensor drive signal to the touch drive electrode. The touch drive electrode is split into a plurality of electrode patterns in a stripe shape, and application of the touch sensor drive signal to part of the plurality of electrode patterns causes a drive line to be formed at that time. The touch detection circuit performs the detection on the basis of a first detection signal obtained from a first drive line formed in a first period, and a second detection signal obtained from a second drive line formed in a second period different from the first period and having a smaller line width than the first drive line.

A display device according to an embodiment of the present invention includes a plurality of display pixel electrodes, a common electrode provided in opposition to the display pixel electrodes, a display function layer having an image display function, a display control circuit that controls image display on the basis of an image signal so as to apply a display drive voltage between the display pixel electrodes and the common electrode to cause the display function layer to exert the image display function, on the basis of an image signal, a touch detection electrode provided in opposition to or side by side with the common electrode and forming an electrostatic capacitance between the touch detection electrode and the common electrode, and a touch detection circuit that performs a detection of a contact or proximity position of an object, on the basis of a detection signal obtained from the touch detection electrode, by using the display drive voltage applied to the common electrode by the display control circuit as a touch sensor drive signal. The common electrode is split into a plurality of electrode patterns in a stripe shape, and application of the touch sensor drive signal to part of the plurality of electrode patterns causes a drive line to be formed at that time. The touch detection circuit performs the detection on the basis of a first detection signal obtained from a first drive line formed in a first period, and a second detection signal obtained from a second drive line formed in a second period different from the first period and having a smaller line width than the first drive line.

An electronic apparatus according to an embodiment of the present invention includes the above-mentioned display device according to an embodiment of the present invention.

In the touch sensor, the display device, and the electronic apparatus according to an embodiment of the present invention, an electronic capacitance is formed between the common electrode or the touch drive electrode originally provided for applying the display drive voltage, and the touch detection electrode. This electrostatic capacitance changes depending on the presence/absence of contact or proximity of an object. Therefore, by using the touch sensor drive signal applied to the common electrode or the touch drive electrode, a detection signal responsive to a change in electrostatic capacitance is obtained from the touch detection electrode. Then, by inputting this detection signal to the touch detection circuit, the contact or proximity position of an object (the presence/absence of contact or proximity of an object) is detected. At this time, the touch detection circuit performs a detection on the basis of the first detection signal obtained from the first drive signal formed in the first period, and the second detection signal obtained from the second drive line formed in the second period different from the first period. Since the line width of the second drive line is smaller than the line width of the first drive line, by using the first detection signal and the second detection signal obtained from the respective lines (for example, by taking the difference between the two detection signals), a detection can be performed while reducing the influence of noise (internal noise) contained in the detection signal due to an image signal writing operation at the time of image display control.

BRIEF DESCRIPTION OF THE DRAWINGS

FIG. 4 is a cross-sectional view showing the schematic cross-sectional structure of a display device with a touch sensor according to a first embodiment of the present invention;

FIGS. 9A to 9C are schematic diagrams showing an example of line sequential operation drive of a common electrode;

FIGS. 11A and 11B are timing diagrams for explaining an example of an internal noise removal method according to the first embodiment;

FIGS. 15A and 15B are timing diagrams for explaining an internal noise removal method according to a modification of the first embodiment;

FIG. 16 is a cross-sectional view showing the schematic cross-sectional structure of a display device with a touch sensor according to a second embodiment of the present invention;

FIGS. 18A and 18B are exploded perspective views of the main portion of the display device shown in FIG. 16;

FIG. 20 is a cross-sectional view showing the schematic cross-sectional structure of a display device with a touch sensor according to a modification of the second embodiment;

FIG. 22 is a perspective view showing the outward appearance of Application 1 of the display device according to each of the above embodiments and the like;

FIGS. 26A to 26G are a front view of Application 5 when open, a side view thereof, a front view when closed, a left side view, a right side view, a top view, and a bottom view, respectively;

DESCRIPTION OF THE PREFERRED EMBODIMENTS

Hereinbelow, embodiments of the present invention will be described in detail with reference to the drawings. It should be noted that the description will be given in the following order of topics.

Basic Principle of Touch Detection System

1. First Embodiment (an example of internal noise removal method using two drive lines of different widths)

2. Second Embodiment (an example using a liquid crystal element of a transverse electric field mode as a display element)

3. Applications (applications of a display device with a touch sensor to an electronic apparatus)

4. Other Modifications

<Basic Principle of Touch Detection System>

Figure 1A:
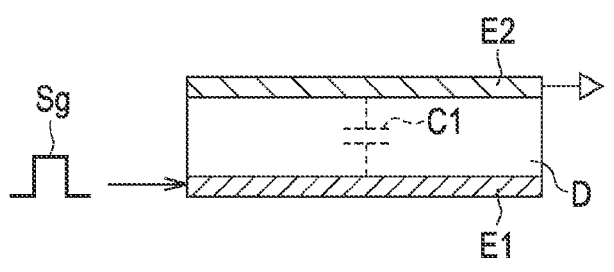
FIGS. 1A and 1B are diagrams for explaining the operation principle of a display device with a touch sensor according to an embodiment of the present invention, showing a state when a finger is not in contact.

First, referring to FIGS. 1A to 3B, a description will be given of the basic principle of a touch detection system in a display device with a touch sensor according to an embodiment of the present invention. This touch detection system is to be implemented as a capacitive touch sensor. For example, as shown in FIG. 1A, a capacitor is formed by using a pair of electrodes (a drive electrode E1 and a detection electrode E2) opposed to each other with a dielectric D therebetween. This structure is represented as an equivalent circuit shown in FIG. 1B. A capacitor C1 is formed by the drive electrode E1, the detection electrode E2, and the dielectric D. One end of the capacitor C1 is connected to an AC signal source (drive signal source) S, and the other end P is grounded via a resistor R, and connected to a voltage detector (detection circuit) DET. When an AC rectangular wave Sg (FIG. 3B) of a predetermined frequency (for example, about several kHz to ten and several kHz) is applied from the AC signal source S to the drive electrode E1 (one end of the capacitor C1), an output waveform (detection signal Vdet) as shown in FIG. 3A appears in the detection electrode E2 (the other end P of the capacitor C1). It should be noted that this AC rectangular wave Sg corresponds to a common drive signal Vcom described later.

Figure 1B:
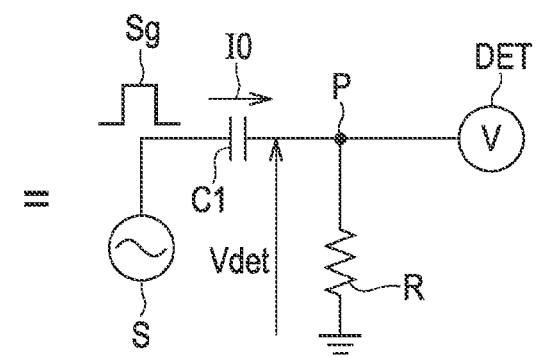

In a state when the finger is not in contact (or proximity), as shown in FIG. 1B, a current I0 varying with the capacitance value of the capacitor C1 flows as the capacitor C1 is charged and discharged. The potential waveform at the other end P of the capacitor C1 at this time becomes as indicated by the waveform V0 in FIG. 3A, for example, which is detected by the voltage detector DET.

Figure 2A:
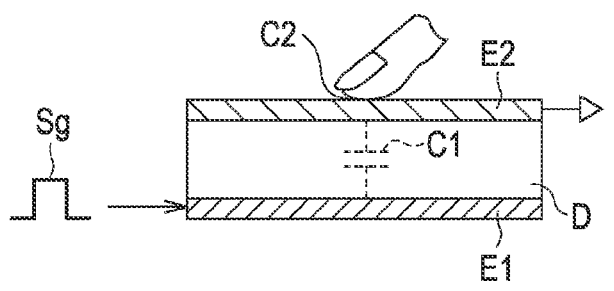
FIGS. 2A and 2B are diagrams for explaining the operation principle of a display device with a touch sensor according to an embodiment of the present invention, showing a state when a finger is in contact.
Figure 2B:
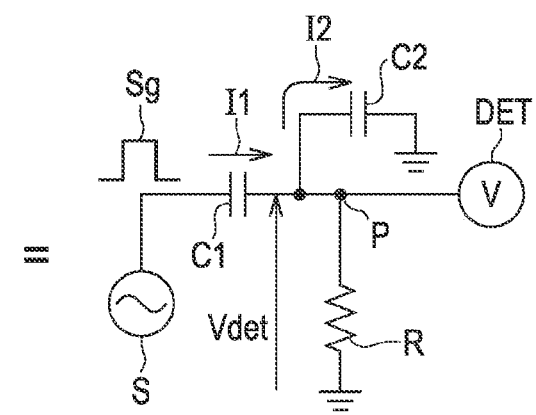
Figure 3A:
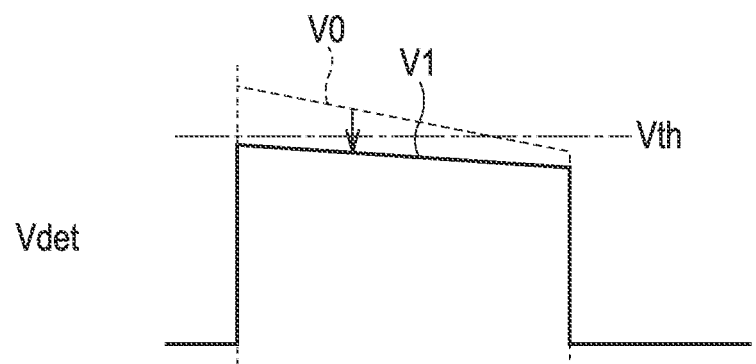
FIGS. 3A and 3B are diagrams for explaining the operation principle of a display device with a touch sensor according to an embodiment of the present invention, showing an example of the waveforms of a drive signal and detection signal of a touch sensor.
Figure 3B:

On the other hand, in a state when the finger is in contact (or proximity), as shown in FIGS. 2A and 2B, a capacitor C2 formed by the finger is added in series to the capacitor C1. In this state, currents I1, I2 flow as the capacitors C1, C2 are charged and discharged, respectively. The potential waveform at the other end P of the capacitor C1 at this time becomes as indicated by the waveform V1 in FIG. 3A, for example, which is detected by the voltage detector DET. At this time, the potential at the point P is a partial potential determined by the values of the currents I1, I2 flowing in the capacitors C1, C2. Thus, the waveform V1 becomes smaller in value than the waveform V0 in the non-contact state. As will be described later, the voltage detector DET compares the detected voltage with a predetermined threshold voltage Vth, and judges the current state to be a non-contact state if the detector voltage is equal to or greater than this threshold voltage. On the other hand, the voltage detector DET judges the current state to be a contact state if the detector voltage is less than the threshold voltage. In this way, touch detection becomes possible.

1. First Embodiment

Example of Configuration of Display Device 1

FIG. 4 shows the cross-sectional structure of the main portion of a display device 1 with a touch sensor according to a first embodiment of the present invention. In the display device 1, a capacitive touch sensor is formed by using a liquid crystal display element as a display element, and sharing the use of part (common electrode 43 described later) of electrodes originally provided to this liquid crystal display element and a display drive signal (common drive signal Vcom described later).

As shown in FIG. 4, the display device 1 includes a pixel substrate 2, a counter substrate 4 opposed to the pixel substrate 2, and a liquid crystal layer 6 inserted between the pixel substrate 2 and the counter substrate 4.

The pixel substrate 2 has a TFT substrate 21 as a circuit board, and a plurality of pixel electrodes 22 disposed in matrix on the TFT substrate 21. In addition to display drivers and TFTs (thin film transistors) (not shown) for driving the individual pixel electrodes 22, wires such as source wires (source wires 25 described later) for supplying image signals to the individual pixel electrodes, and gate wires (gate wires 26 described later) for driving individual TFTs are formed on the TFT substrate 21. A detection circuit (FIG. 8) that performs a touch detection described later may be also formed on the TFT substrate 21.

The counter substrate 4 includes a glass substrate 41, a color filter 42 formed on one surface of the glass substrate 41, and a common electrode 43 formed on the color filter 42. The color filter 42 is formed by periodically arranging color filter layers of three colors, for example, red (R), green (G), and blue (B). A set of the three colors of R, G, and B is associated with each of display pixels (pixel electrodes 22). The common electrode 43 also doubles as a sensor drive electrode constituting a part of the touch sensor for performing a touch detection, and corresponds to the drive electrode E1 shown in FIG. 1A.

The common electrode 43 is coupled to the TFT substrate 21 by a contact conductive column 7. A common drive signal Vcom having an AC rectangular waveform is applied from the TFT substrate 21 to the common electrode 43 via the contact conductive column 7. While this common drive signal Vcom defines the display voltage of each pixel together with a pixel voltage applied to each of the pixel electrodes 22, the common drive signal Vcom also doubles as a drive signal for the touch sensor, and corresponds to the AC rectangular wave Sg supplied from the drive signal source S shown in FIGS. 1A and 1B. That is, the common drive signal Vcom is inverted in polarity at every predetermined cycle.

A sensor detection electrode (touch detection electrode) 44 is formed on the other surface of the glass substrate 41. Further, a polarizing plate 45 is disposed on the sensor detection electrode 44. The sensor detection electrode 44 constitutes a part of the touch sensor, and corresponds to the detection electrode E2 shown in FIG. 1A.

The liquid crystal layer 6 modulates light passing through the liquid crystal layer 6 in accordance with the state of the electric field. For example, a liquid crystal of various modes such as TN (Twisted Nematic), VA (Vertical Alignment), and ECB (Electrically Controlled Birefringence) is used for the liquid crystal layer 6.

An alignment film is disposed between the liquid crystal layer 6 and the drive substrate 2, and between the liquid crystal layer 6 and the counter substrate 4, and an incidence-side polarizing plate is arranged on the lower surface side of the pixel substrate 2. However, illustration of these components is omitted here.

(Exampled of Detailed Configuration of Common Electrode 43 and Sensor Detection Electrode 44)

Figure 5:
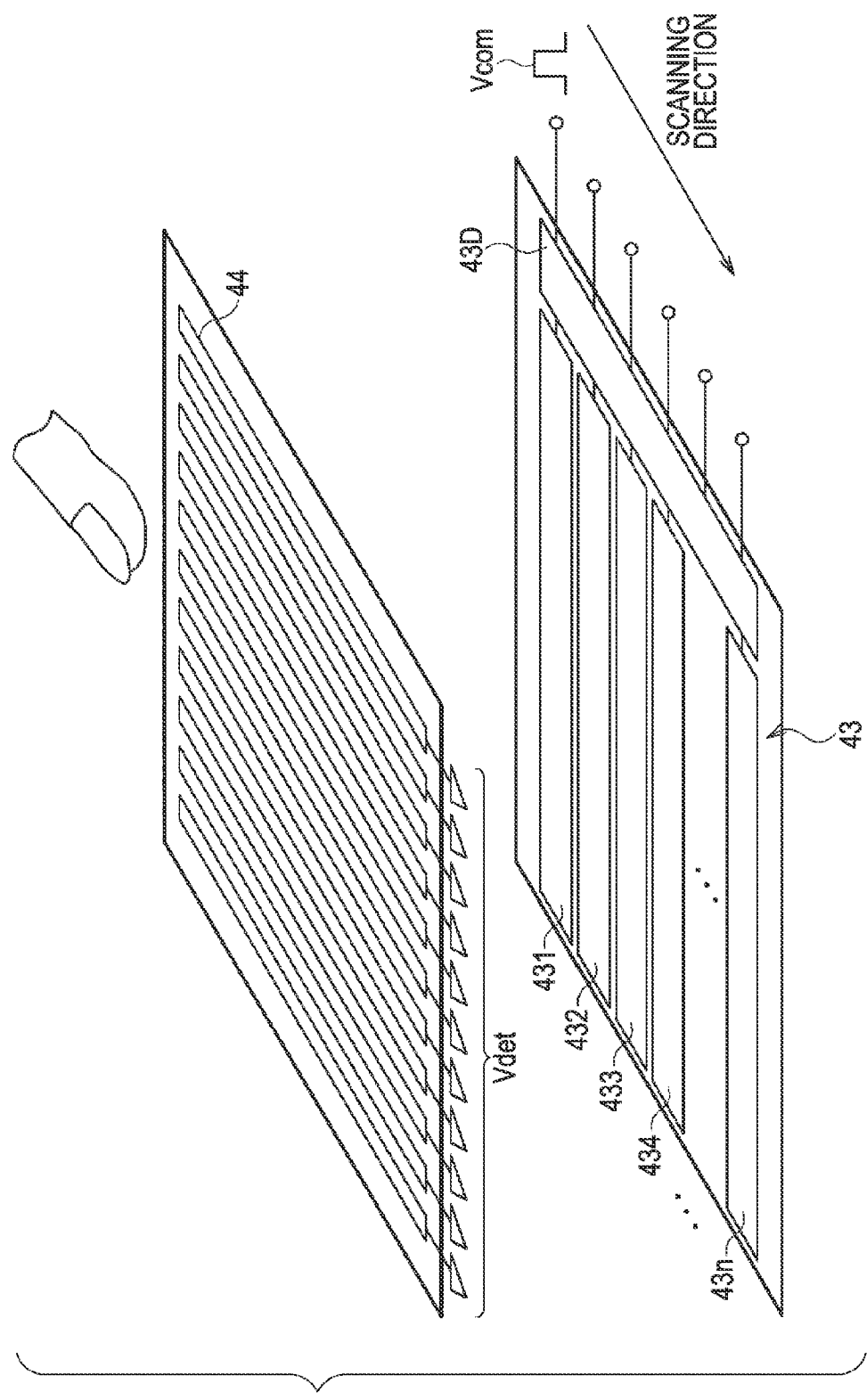
FIG. 5 is a perspective view showing an example of the configuration of the main portion (a common electrode and a sensor detection electrode) of the display device shown in FIG. 4.

FIG. 5 illustrates an example of the configuration of the common electrode 43 and the sensor detection electrode 44 in the counter substrate 4 in perspective view. In this example, the common electrode 43 is split into a plurality of stripe-like electrode patterns (here, for example, n(n: an integer not smaller than 2) common electrodes 431 to 43n) extending in the horizontal direction of the drawing. The common drive signal Vcom is sequentially supplied by a common electrode driver 43D to each electrode pattern, thereby performing a line sequential scanning drive in a time division manner as will be described later. On the other hand, the sensor detection electrode 44 includes a plurality of stripe-like electrode patterns extending in a direction orthogonal to the direction in which the electrode patterns of the common electrode 43 extend. A detection signal Vdet is outputted from each of the electrode patterns of the sensor detection electrode 44, and inputted to the detection circuit 8 shown in FIGS. 6 to 8 and the like.

(Example of Pixel Structure and Configuration of Drivers)

Figure 6:
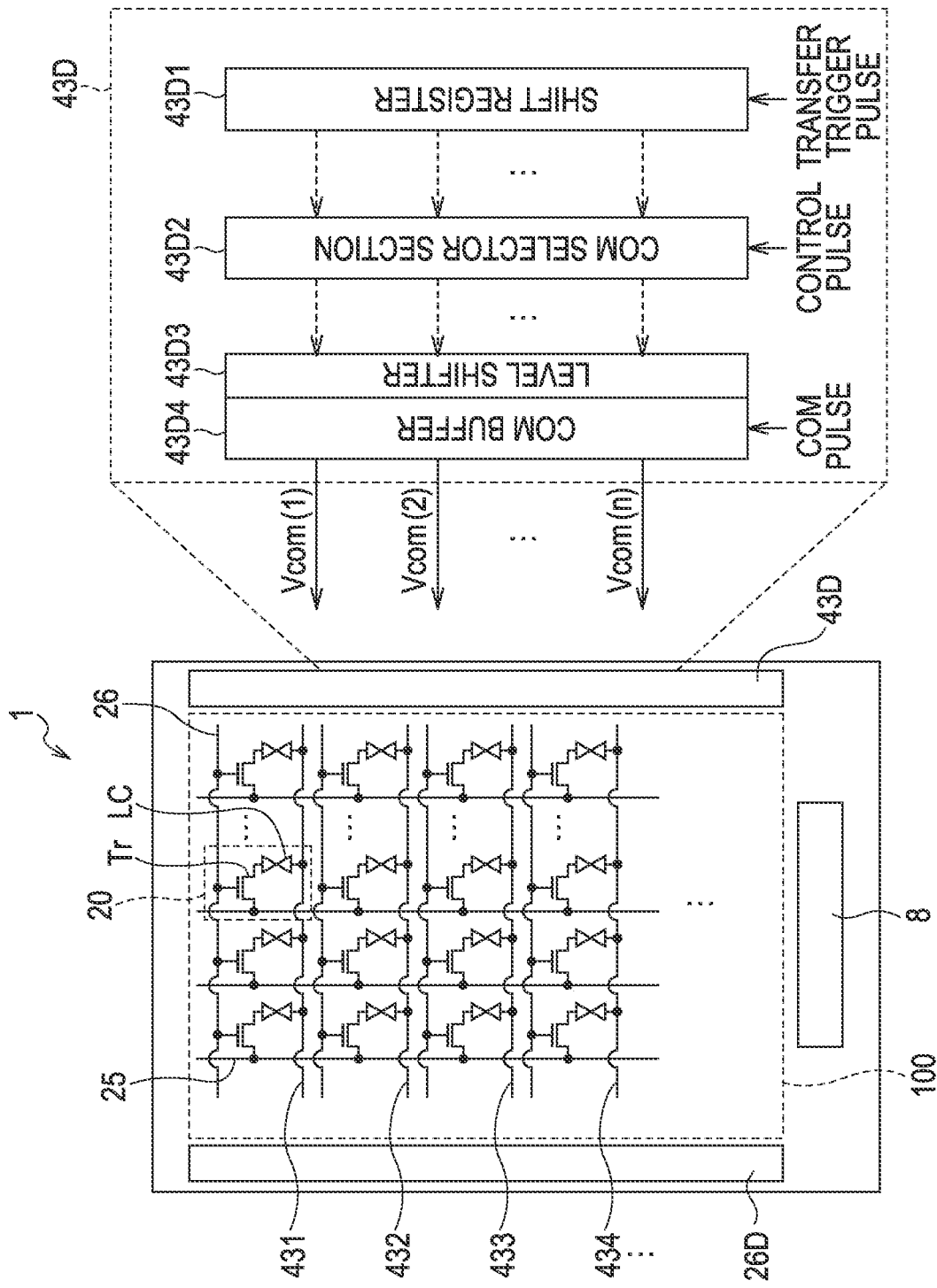
FIG. 6 is a block diagram showing an example of the pixel structure and detailed driver configuration in the display device shown in FIG. 4.
Figure 7:
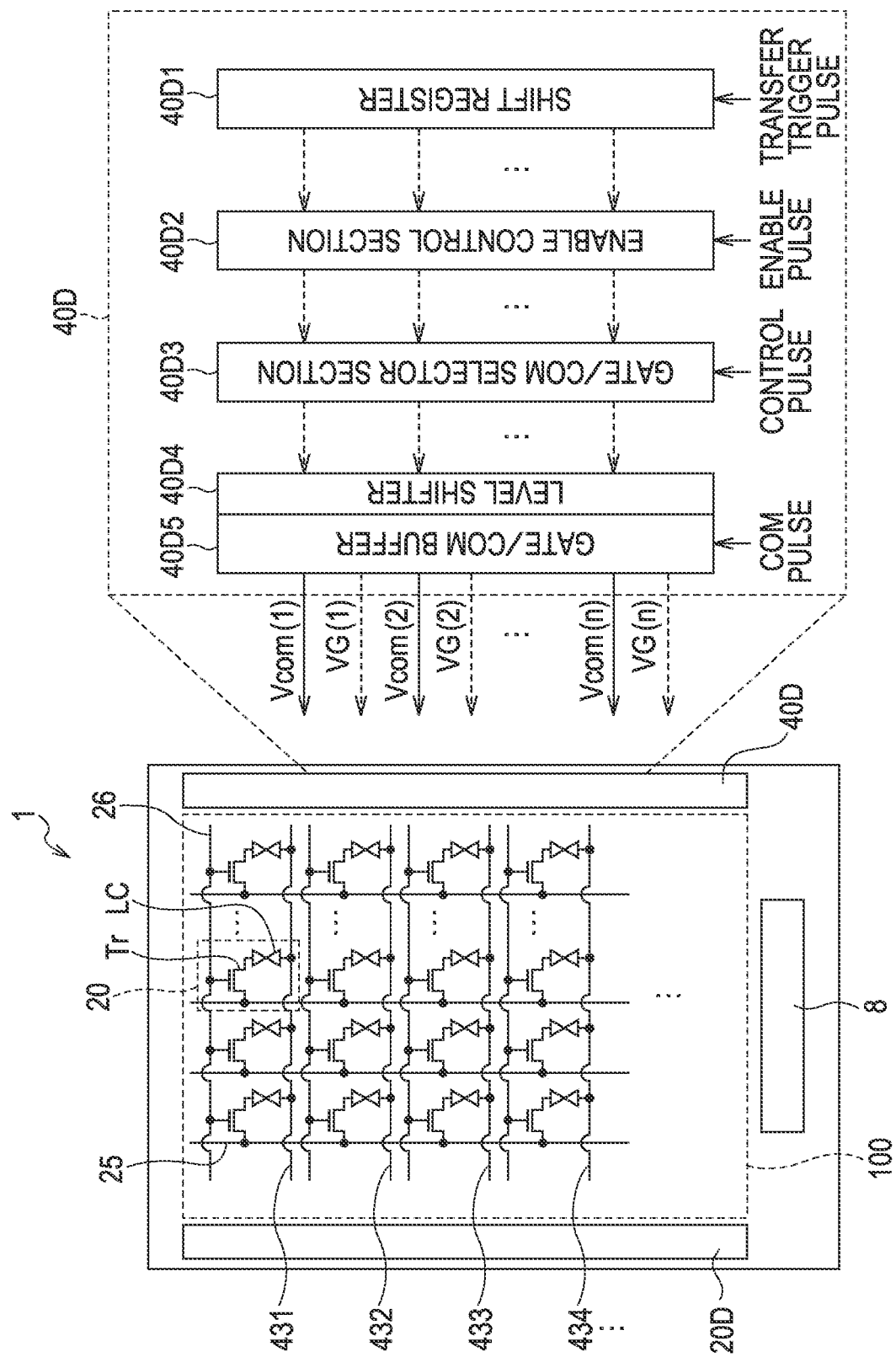
FIG. 7 is a block diagram showing another example of the pixel structure and detailed driver configuration in the display device shown in FIG. 4.

FIGS. 6 and 7 each show an example of pixel structure and configuration of various drivers in the display device 1. In the display device 1, a plurality of pixels (display pixels 20) each having a TFT element Tr and a liquid crystal element LC are arranged in matrix inside an effective display area 100.

In the example shown in FIG. 6, the gate wires 26 connected to a gate driver 26D, the signal wires (source wires) 25 connected to a source driver (not shown), and the common electrodes 431 to 43n connected to the common electrode driver 43D are connected to the display pixels 20. As described above, the common electrode driver 43 sequentially supplies the common drive signal Vcom(Vcom (1) to Vcom(n)) to the common electrodes 431 to 43n. The common electrode driver 43D has, for example, a shift register 43D1, a COM selector section 43D2, a level shifter 43D3, and a COM buffer 43D4.

The shift register 43D1 is a logic circuit for sequentially transferring an input pulse. Specifically, clock transfer is started by inputting a transfer trigger pulse (start pulse) to the shift register 43D1. In the case when the start pulse is inputted a plurality of times within a single frame period, transfer can be repeated every time such an input is made. It should be noted that the shift register 43D1 may be configured as independent transfer logic circuits for individually controlling the plurality of common electrodes 431 to 43n. It should be noted, however, that since the control circuit scale increases in that case, as shown in FIG. 7 described later, it is preferable that the transfer logic circuit be shared by the gate driver and the common electrode driver, and it is further preferable that the transfer logic circuit be unitary irrespective of the number of the common electrodes 43.

The COM selector section 43D2 is a logic circuit that performs a control of whether or not to output the common drive signal Vcom to each of the display pixels 20 within the effective display area 100. That is, the COM selector section 43D2 controls the output of the common drive signal Vcom in accordance with the position or the like within the effective display area 100. Further, although will be described later in detail, by making the control pulse inputted to the COM selector section 43D2 variable, it is possible, for example, to arbitrarily move the output position of the common drive signal Vcom on a per horizontal line basis, or to move the output position after a plurality of horizontal periods.

The level shifter 43D3 is a circuit for shifting a control signal supplied from the COM selector section 43D2 to a potential level sufficient for controlling the common drive signal Vcom.

The COM buffer 43D4 is a final output logic circuit for sequentially supplying the common drive signal Vcom(Vcom(1) to Vcom(n)), and includes an output buffer circuit, a switching circuit, and the like.

On the other hand, in the example shown in FIG. 7, the gate wires 26 and the common electrodes 431 to 43n connected to a gate/common electrode driver 40D, and the signal wires (source wires) 25 connected to a source driver (not shown) are connected to the display pixels 20. The gate/common electrode driver 40D supplies a gate drive signal to each of the display pixels 20 via the gate wires 26, and sequentially supplies the common drive signal Vcom (Vcom(1) to Vcom(n)) to each of the common electrodes 431 to 43n. The gate/common electrode driver 40D has, for example, a shift register 40D1, an enable control section 40D2, a gate/COM selector section 40D3, a level shifter 40D4, and a gate/COM buffer 40D5.

The shift register 40D1 has the same function as the shift register 43D1 described above except that the shift register 40D1 is shared by the gate driver and the common electrode driver.

The enable control section 40D2 generates a pulse for controlling the gate wires 26 by taking in an enable pulse by using a clock pulse transferred from the shift register 40D1.

The gate/COM selector section 40D3 is a logic circuit that performs a control of whether or not to output the common drive signal Vcom and a gate signal VG to each of the display pixels 20 within the effective display area 100. That is, the gate/COM selector section 40D3 controls the respective outputs of the common drive signal Vcom and gate signal VG in accordance with the position or the like within the effective display area 100.

The level shifter 40D4 is a circuit for shifting a control signal supplied from the gate/COM selector section 40D3 to a potential level sufficient for controlling the gate signal VG and the common drive signal Vcom.

The gate/COM buffer 40D5 is a final output logic circuit for sequentially supplying the common drive signal Vcom (Vcom(1) to Vcom(n)) and the gate signal VG(VG(1) to VG(n)), and includes an output buffer circuit, a switching circuit, and the like.

In the example shown in FIG. 7, a T/G-DC/DC converter 20D is provided within the display device 1 in addition to these components. The T/G-DC/DC converter 20D serves as a TG (timing generator) and a DC/DC converter.

(Example of Circuit Configuration of Drive Signal Source S and Detection Circuit 8)

Figure 8:
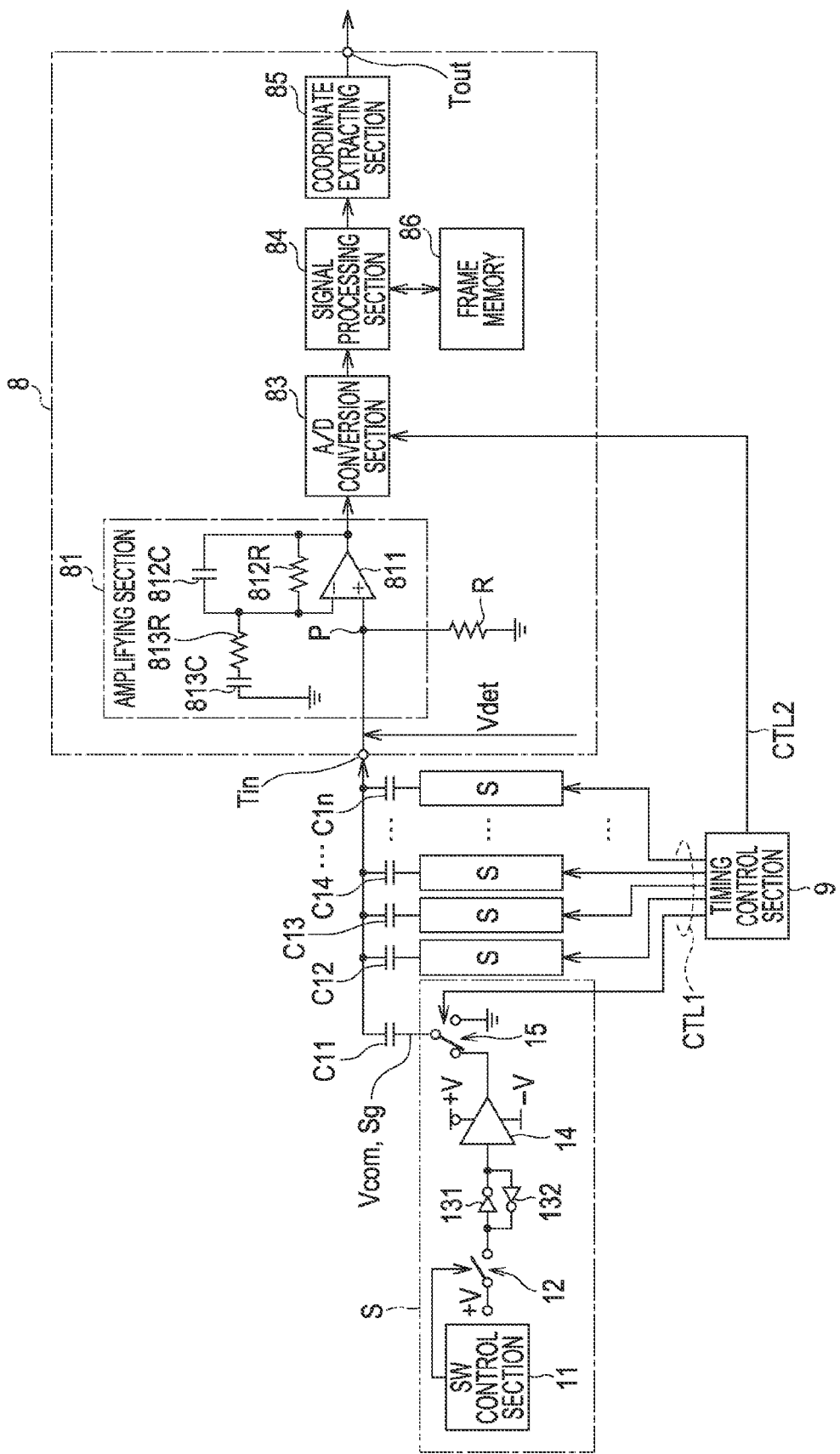
FIG. 8 is a circuit diagram showing an example of the configuration of a detection circuit and the like in the display device shown in FIG. 4.

FIG. 8 shows an example of the circuit configuration of the drive signal source S shown in FIG. 1B and the detection circuit 8 that performs a touch detection, together with a timing control section 9 serving as a timing generator. In this drawing, capacitors C11 to C1n correspond to (electrostatic) capacitors formed between the individual common electrodes 431 to 43n and the sensor detection electrode 44 shown in FIG. 5.

One drive signal source S is provided for each of the capacitors C11 to C1n. The drive signal source S has a SW control section 11, two switching elements 12, 15, two inverter (NOT) circuits 131, 132, and an operational amplifier 14. The SW control section 11 controls the ON/OFF state of the switching element 12, thereby controlling the connection state between a power supply+V and the inverter circuits 131, 132. The input terminal of the inverter circuit 131 is connected to one end (terminal on the side opposite to the power supply+V) of the switching element 12 and the output terminal of the inverter circuit 132. The output terminal of the inverter circuit 131 is connected to the input terminal of the inverter circuit 132 and the input terminal of the operational amplifier 14. Thus, the inverter circuits 131, 132 each function as an oscillating circuit for outputting a predetermined pulse signal. The operational amplifier 14 is connected to the two power supplies +V, −V. The ON/OFF state of the switching element 15 is controlled in accordance with a timing control signal CTL1 supplied from the timing control section 9. Specifically, one end side (the common electrodes 431 to 43n side) of the capacitors C11 to C1n is connected to the outer terminal side (the supply source side of the common voltage signal Vcom) of the operational amplifier 14 or the ground. Thus, the common drive signal Vcom is supplied from each of the drive signal sources S to each of the capacitors C11 to C1n.

The detection circuit 8 (voltage detector DET) has an amplifying section 81, an A/D (analog/digital) conversion section 83, a signal processing section 84, a frame memory 86, a coordinate extracting section 85, and the resistor R described above. It should be noted that the input terminal Tin of the detection circuit 8 is connected commonly to the other end side (the sensor detection electrode 44 side) of the capacitors C11 to C1n.

The amplifying section 81 is a section that amplifies the detection signal Vdet inputted from the input terminal Tin, and has an operational amplifier 811 for signal amplification, two resistors 812R, 813R, and two capacitors 812C, 813C. The positive input end (+) of the operational amplifier 811 is connected to the input terminal Tin, and the output end is connected to the input end of the A/D conversion section 83 described later. One ends of the resistor 812R and the capacitor 812C are both connected to the output end of the operational amplifier 811, and the other ends of the resistor 812R and the capacitor 812C are both connected to the negative input end (−) of the operational amplifier 811. In addition, one end of the resistor 813R is connected to the other ends of the resistor 812R and the capacitor 812C, and the other end of the resistor 813R is connected to the ground via the capacitor 813C. Thus, the resistor 812R and the capacitor 812C function as a low-pass filter (LPF) that cuts high frequencies and passes low frequencies, and the resistor 813R and the capacitor 813C function as a high-pass filter (HPF) that passes high frequencies.

The resistor R is arranged between a node P on the positive input end (+) side of the operational amplifier 811, and the ground. The resistor R is provided to maintain a stable state by avoiding floating of the sensor detection electrode 44. This not only prevents fluctuations in the signal value of the detector signal Vdet in the detection circuit 8, but also provides an advantage of releasing static electricity to the ground via the resistor R.

The A/D conversion section 83 converts the analog detection signal Vdet amplified by the amplifying section 81 into a digital detection signal, and includes a comparator (not shown). This comparator compares the potentials of an inputted detection signal and the predetermined threshold voltage Vth (see FIGS. 3A and 3B). It should be noted that the sampling timing at the time of A/D conversion in the A/D conversion section 83 is controlled by a timing control signal CTL2 supplied from the timing control section 9.

The signal processing section 84 applies predetermined signal processing (for example, signal processing such as digital noise removal, or conversion of frequency information into positional information) to a digital detection signal outputted from the A/D conversion section 83. Although described later in detail, the signal processing section 84 is also configured to perform predetermined arithmetic processing for removing (suppressing) the influence of noise (internal noise) resulting from an image signal writing operation, together with the frame memory 86.

The coordinate extracting section 85 obtains a detection result (whether or not a touch has been made, and the position coordinates of the touch location if a touch has been made) on the basis of a detection signal (a detection signal that has undergone the internal noise removal mentioned above) outputted from the signal processing section 84, and outputs the detection result from the output terminal Tout.

It should be noted that the above-mentioned detection circuit 8 may be formed in a peripheral region (non-display region or rim region) on the counter substrate 4, or may be formed in a peripheral region on the pixel substrate 2. However, forming the detection circuit 8 on the pixel substrate 2 is more preferable from the viewpoint of achieving simplification by circuit integration, because it is possible to achieve integration with various circuit elements and the like for display control originally formed on the pixel substrate 2. In this case, each electrode pattern of the sensor detection electrode 44 and the detection circuit 8 on the pixel substrate 2 may be connected to each other by a contact conductive column (not shown) similar to the contact conductive column 7, and the detection signal Vdet may be transmitted from the sensor detection electrode 44 to the detection circuit 8.

[Operation/Effect of Display Device 1]

Next, the operation and effect of the display device 1 according to this embodiment will be described.

(Basic Operation)

In the display device 1, a display driver (such as the common electrode driver 43D) on the pixel substrate 2 supplies the common drive signal Vcom in a line sequential manner to each of the electrode patterns (common electrodes 431 to 43n) of the common electrode 43. This display driver also supplies pixel signals (image signals) to the pixel electrodes 22 via the source wires 25, and in synchronization with this, controls the switching of the TFTs (TFT elements Tr) of the pixel electrodes via the gate wires 26 in a line sequential manner. Thus, an electric field in the vertical direction (direction perpendicular to the substrate) determined by the common drive signal Vcom and each image signal is applied to the liquid crystal layer 6 for each display pixel 20, thereby modulating the liquid crystal state. In this way, display by the so-called inversion drive is performed.

On the other hand, on the side of the counter substrate 4, the capacitor C1 (capacitors C11 to C1n) is formed at each of the intersections between the individual electrode patterns of the common electrode 43 and the individual electrode patterns of the sensor detection electrode 44. At this time, the following occurs when, as indicated by the arrow (scanning direction) in FIG. 5, for example, the common drive signal Vcom is sequentially applied in a time division manner to each of the electrode patterns of the common electrode 43. That is, charging and discharging are performed with respect to each of a row of capacitors C11 to C1n formed at the intersections between the electrode pattern of the common electrode 43 to which the common drive signal Vcom has been applied, and the individual electrode patterns of the sensor detection electrode 44. As a result, the detection signal Vdet of a magnitude varying with the capacitance value of the capacitor C1 is outputted from each of the electrode patterns of the sensor detection electrode 44. In a state when a user's finger is not in touch with the surface of the counter substrate 4, the magnitude of this detection signal Vdet is substantially constant. In accordance with the scanning of the common drive signal Vcom, the row of the capacitors C1 to be charged and discharged moves in a line sequential manner.

It should be noted that when performing such line sequential driving of the electrode patterns of the common electrode 43, for example, as shown in FIGS. 9A to 9C, it is preferable to perform a line sequential drive in batches made up of part of the electrode patterns of the common electrode 43. Specifically, drive lines L including this part of electrode patterns are made up of a position detection drive line L1 including a plurality of lines of electrode patterns, and a display drive line L2 including a small number of lines (one line in this example) of electrode patterns. This makes it possible to suppress image quality degradation due to the occurrence of streaks, speckles, or the like corresponding to the shape of the electrode patterns of the common electrode 43.

At this time, when a user's finger touches any one of locations on the surface of the counter substrate 4, the capacitor C2 due to the finger is added to the capacitor C1 originally formed at the touch location. As a result, the detection signal Vdet at the time when the touch location is scanned (that is, when the common drive signal Vcom is applied to an electrode pattern corresponding to the touch location among the electrode patterns of the common electrode 43) becomes smaller in value than at other locations. The detection circuit 8 (FIG. 8) compares this detection signal Vdet with the threshold voltage Vth, and determines the location concerned to be a touch location if the detection signal Vdet is less than the threshold voltage Vth. This touch location can be calculated from the application timing of the common drive signal Vcom, and the detection timing of the detection signal Vdet less than the threshold voltage Vth.

In this way, in the display device 1 with a touch sensor according to this embodiment, the common electrode 43 originally provided to the liquid crystal display element doubles as one of a pair of touch sensor electrodes including a drive electrode and a detection electrode. In addition, the common drive signal Vcom as a display drive signal is also used as a touch sensor drive signal. Thus, in a capacitive touch sensor, it is necessary to additionally provide only the sensor detection electrode 44, and it is unnecessary to prepare a touch sensor drive signal. Therefore, the configuration is simple.

In the case of the display device with a touch sensor according to the related art (Japanese Unexamined Patent Application Publication No. 2008-9750), the magnitude of a current flowing in the sensor is accurately measured, and the touch position is determined by analog computation on the basis of the measured value. In contrast, in the display device 1 according to this embodiment, it suffices to digitally detect the presence/absence of a relative change in current (potential change) based on the presence/absence of a touch, thereby making it possible to enhance the detection accuracy by a simple detection circuit configuration. In addition, an electrostatic capacitance is formed between the common electrode 43 that is originally provided for application of the common drive signal Vcom, and the sensor detection electrode 44 that is additionally provided, and touch detection is performed by exploiting the fact that this capacitance changes due to the contact of a user's finger. Thus, the display device can be also adapted for mobile apparatus applications in which the potential on the user side is often inconstant.

Further, since the sensor detection electrode 44 is split into a plurality of electrode patterns, and the electrode patterns are individually driven in a time division manner, detection of a touch position also becomes possible.

(Operation of Characteristic Portion: Detection Using Noise Removal Process)

Next, referring to FIGS. 10A to 14C, a detailed description will be given of a detection using a noise removal process as one of characteristic portions of an embodiment of the present invention.

Figure 10D:
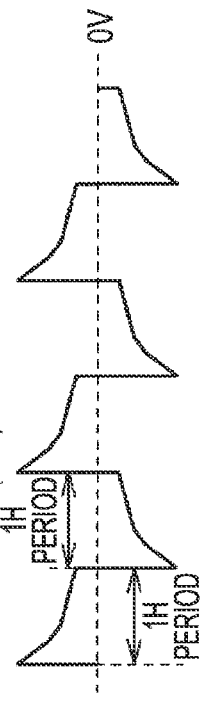
FIGS. 10A to 10F are timing waveform diagrams for explaining noise (internal noise) resulting from a display writing operation at the time of a detection in a display device.
Figure 10E:
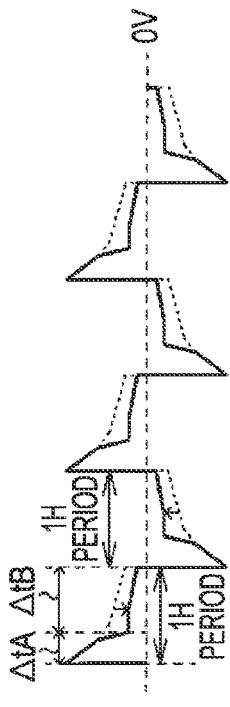
Figure 10F:
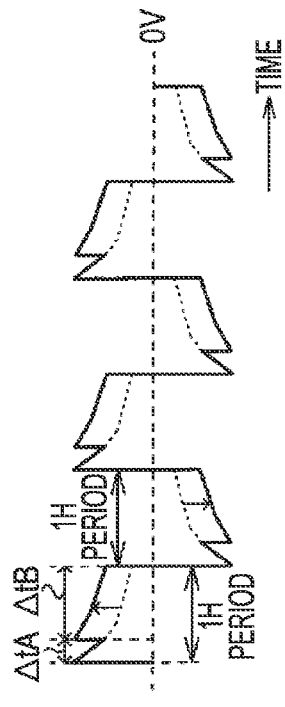
Figure 10A:
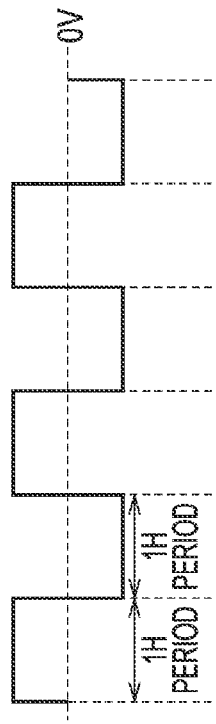
Figure 10B:
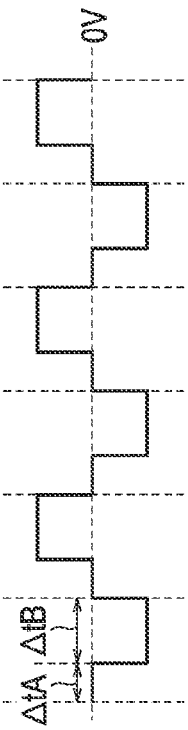
Figure 10C:
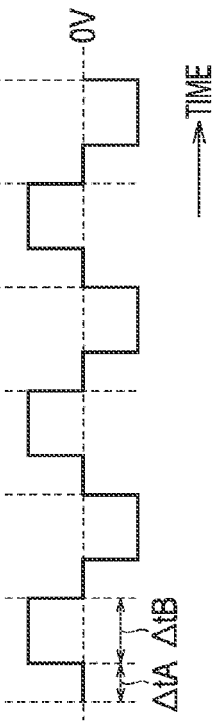

First, in the case when, as shown in FIG. 10A, the common drive signal Vcom undergoes inversion of polarity in synchronism with the drive cycle (1H period) at the time of image display control shown in FIGS. 10B, 10C, the detection waveform of the detection signal Vdet becomes as shown in FIGS. 10D to 10F, for example. That is, inversion of polarity is performed in synchronism with this inversion of polarity, and the signal gradually attenuates after the inversion of polarity due to the leak current flowing in the resistor R described above.

At this time, at the time of pixel signal (image signal) writing such as when writing white and when writing black shown in FIGS. 10B, 10C, for example, noise caused by this writing is contained in the detection waveform of the detection signal Vdet as shown in FIGS. 10E, 10F, for example. Specifically, a 1H period includes a non-writing period ΔtA in which no image signal is applied, and a writing period ΔtB in which an image signal is applied. In the writing period ΔtB of these periods, fluctuations occur in the detection waveform in accordance with the gray level of an image signal. That is, in accordance with the gray level of the (polarity-inverted) image signal at that time, noise (internal noise) caused by the polarity-inverted image signal as indicated by the arrows in FIGS. 10E, 10F is contained in the detection waveform of the detection signal Vdet. Specifically, noise after inversion is contained in the same phase as the common drive signal Vcom when writing black, and is contained in a phase opposite to the common drive signal Vcom when writing white. In this way, in the writing period ΔtB, the detection waveform of the detection signal Vdet fluctuates due to internal noise in accordance with the gray level of an image signal, making it difficult to isolate this from the change in detection waveform due to the presence/absence of contact of an object (FIG. 3).

Accordingly, in this embodiment, the signal processing section 84, the frame memory 86 and the coordinate extracting section 85 within the detection circuit 8 performs object detection while removing the above-mentioned internal noise in the manner as shown in, for example, FIGS. 11A and 11B. Specifically, the signal processing section 84 and the frame memory 86 perform a process of removing (reducing) noise (internal noise) caused by the image signal mentioned above, on the basis of two detection signals Vdet respectively obtained from the drive lines L of different line widths in different periods. Then, the coordinate extracting section 85 performs a detection by using the detection signal obtained after such noise removal (reduction).

More specifically, in the example shown in FIGS. 11A and 11B, the following control is carried out when line-sequentially driving the position detection drive line L1 (m(m: an integer not smaller than 2) lines), and the display drive line L2 with a smaller line width (one line in this example) in the manner as indicated by the arrows in the drawings. That is, first, in a horizontal period such as T=N, N+2 (N: an integer) (first period), the timing control section 9 performs a control such that both the position detection drive line L1 with a large line width and the display drive line L2 with a small line width exist. In addition, in a horizontal period such as T=N+1, N+3 (second period), the timing control section 9 performs a control such that only the display drive line L2 with a small line width exists. In this example shown in FIGS. 11A and 11B, the first period and the second period mentioned above are set alternately at a time ratio of 1 to 1.

Figure 12A:
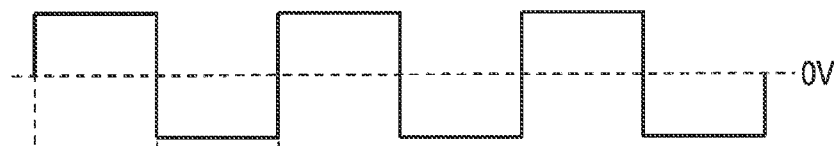
FIGS. 12A and 12B are timing waveform diagrams showing an example of the waveforms of a detection signal and noise signal at the time of the internal noise removal shown in FIGS. 11A and 11B.
Figure 12B:
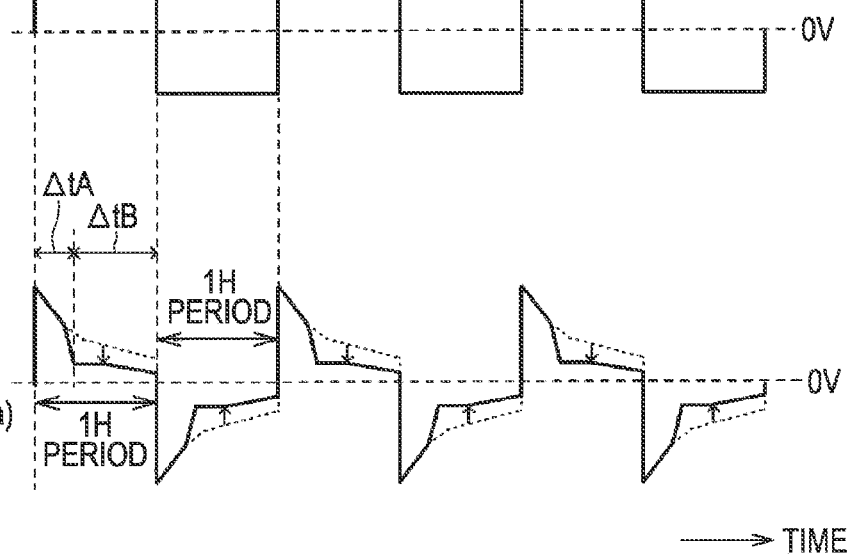

At this time, the waveform of a detection signal Vdet_a (first detection signal) obtained from both the position detection drive line L1 and the display drive line L2 becomes as shown in FIG. 12B, for example. Now, let Cp denote the capacitance value of each of the capacitors C11 to C1n, Cc denote the capacitance value of a capacitance component (parasitic capacitance) other than these capacitors C11 to C1n, V1 denote the effective value of an AC voltage due to the AC signal source S, and Vn denote the effective value of a signal inside noise caused by an image signal. Then, assuming that Cp equals Cc for the sake of simplicity, the detection signal Vdet_a obtained in the first period is represented by Equation (1) below. That is, this detection signal Vdet_a includes a potential fluctuation component Va(=(mxV1)/(n+1)) due to the AC signal source S, and a potential fluctuation component Vb(=Vn) due to noise.

$$\text{Vdet\_a} = V1 \times \frac{m \times Cp}{n \times Cp + Cc} + Vn \quad (1)$$
$$= V1 \times \frac{mCp}{(n+1)Cp} + Vn$$
$$= \frac{mV1}{n+1} + Vn$$

Figure 13A:
FIGS. 13A and 13B are timing waveform diagrams showing an example of the waveform of a noise signal at the time of the internal noise removal shown in FIGS. 11A and 11B.
Figure 13B:
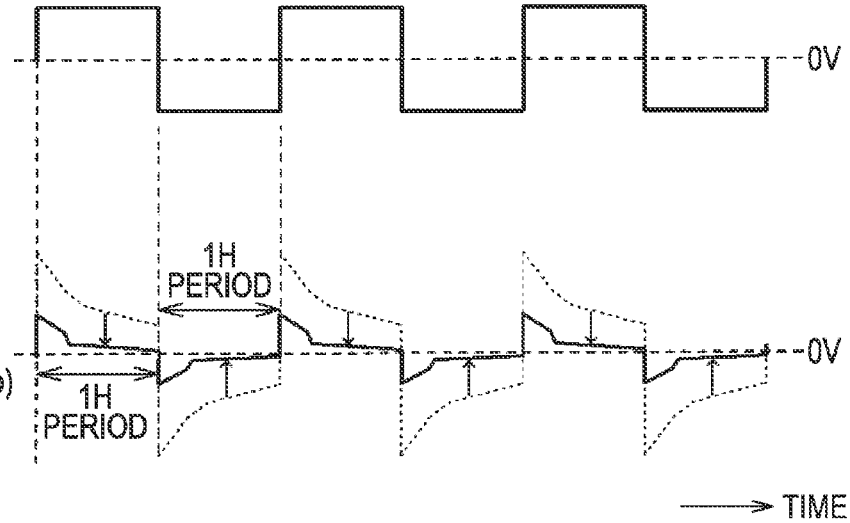

On the other hand, the waveform of a detection signal Vdet_b (second detection signal) obtained from only the display drive line L2 in the second period becomes as shown in FIG. 13B, for example. The detection signal Vdet_b obtained in this second period is represented by Equation (2) below. That is, basically, this detection signal Vdet_b also includes a potential fluctuation component Va (=V1/(n+1)) due to the AC signal source S, and a potential fluctuation component Vb(=Vn) due to noise. It should be noted, however, that assuming WVGA (Wide Video Graphics Array) as an example of resolution of the display pixels 20, then n=864, and assuming m=100, Equations (1) and (2) are (100/864)V1+Vn and (1/864)V1+Vn, respectively. Therefore, the value of the potential fluctuation component Va in Equation (2) is (1/100) of the value of the potential fluctuation component Va in Equation (1), and is sufficiently small relative to the potential fluctuation component Vb(Vn) due to noise. That is, since the potential fluctuation component Va due to the AC signal source S in Equation (2) is negligibly small, the detection signal Vdet_b in Equation (2) can be considered to contain only the potential fluctuation component Vb.

$$Vdet\_b = V1 \times \frac{Cp}{n \times Cp + Cc} + Vn \quad (2)$$
$$= V1 \times \frac{Cp}{(n+1)Cp} + Vn$$
$$= \frac{V1}{n+1} + Vn \approx Vn$$

Therefore, the signal processing section 84 and the frame memory 86 generate a differential signal between the detection signal Vdet_a obtained in the first period, and the detection signal Vdet_b obtained in the second period, in the manner as indicated by Equation (3) below. Thus, the potential fluctuation component Vb(Vn; noise signal) due to noise is removed, and a differential signal made up of only the potential fluctuation component Va (detection signal) due to the AC signal source S is obtained. Accordingly, by performing a detection in the coordinate extracting circuit 85 by using such a detection signal from which noise has been removed (reduced), the influence of noise (internal noise) contained in the detection signal Vdet due to an image signal writing operation can be removed (reduced), thereby enabling an accurate detection.

$$Vdet\_a - Vdet\_b = (\text{detection signal} + \quad (3)$$
$$\text{noise signal}) - (\text{noise signal})$$
$$= (\text{detection signal})$$

In the example shown in FIG. 11A, the position detection drive line L1 and the display drive line L2 are each controlled so as to be line-sequentially driven one line at a time. On the other hand, in the example shown in FIG. 11B, the position detection drive line L1 is set to be located at arbitrary positions (at random positions) within the common electrode 43 which differ from each other between the first period and the first period. In the case of this configuration, the average position detection speed can be improved as compared with the case of FIG. 11A.

Figure 14A:
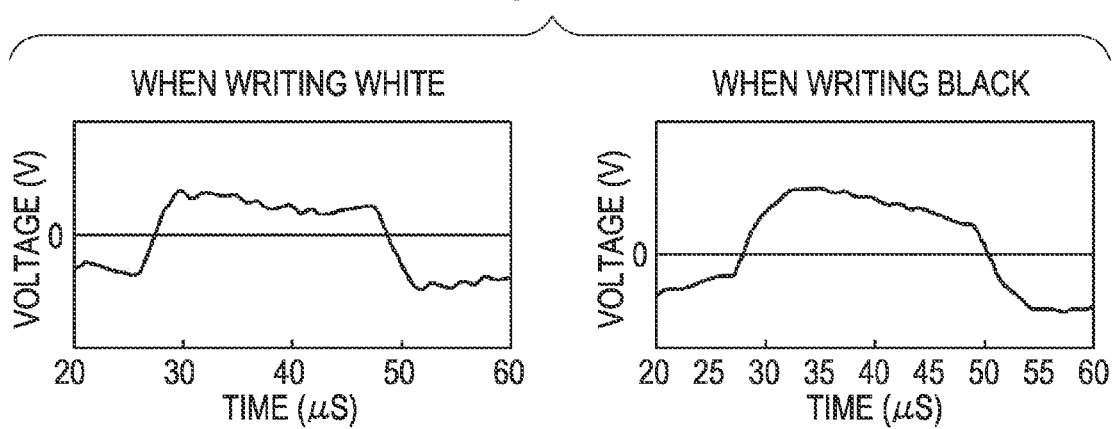
FIGS. 14A to 14C are timing waveform diagrams showing an example of the waveforms at the time of writing white and at the time of writing black in case in which the internal noise removal method shown in FIGS. 11A and 11B is applied.
Figure 14B:
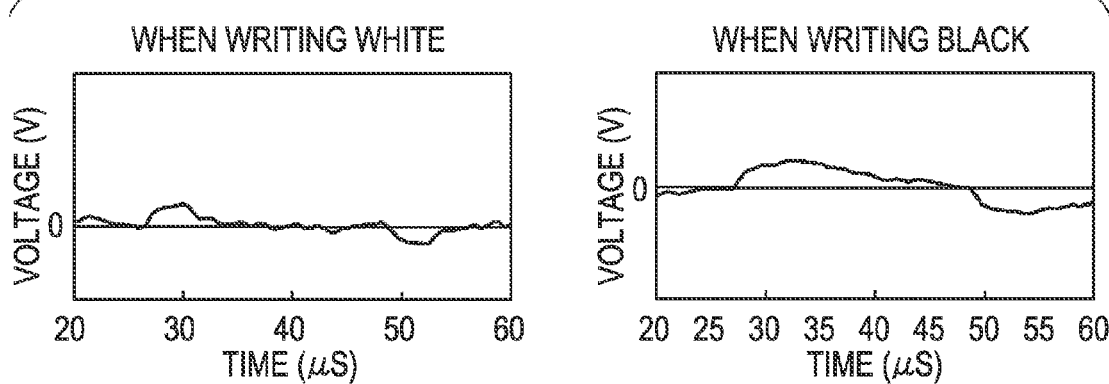
Figure 14C:
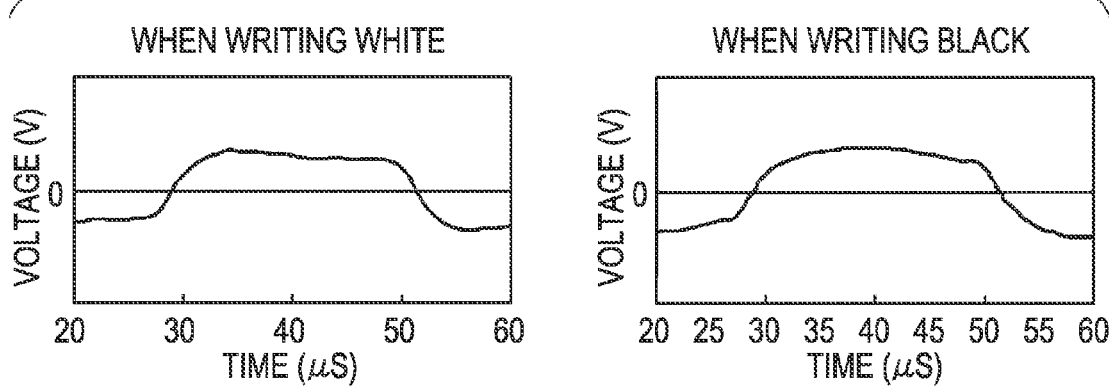

Now, FIGS. 14A to 14C show an example of measured waveforms of: (A) detection signal+noise signal (corresponding to the detection signal Vdet_a); (B) noise signal (corresponding to the detection signal Vdet_b); and (C) detection signal (corresponding to a differential signal (Vdet_a−Vdet_b). It is apparent from FIGS. 14A to 14C that in the differential signal (Vdet_a−Vdet_b) obtained by the technique according to this embodiment, the influence of internal noise contained in the detection signal Vdet is removed (reduced), thereby making it possible to realize an accurate detection.

As described above, in this embodiment, the contact (proximity) position of an object is detected on the basis of the detection signal Vdet obtained from the touch detection electrode in accordance with a change in electrostatic capacitance, and a detection is performed in the detection circuit 8 on the basis of the detection signal Vdet_a obtained from the position detection drive line L1 and the display drive line L2 formed in the above-mentioned first period, and the detection signal Vdet_b obtained from the display drive line L2 formed in the second period different from the first period. Thus, a detection can be performed while removing (reducing) the influence of the internal noise mentioned above, for example, without using a shield layer as in the related art. Therefore, it is possible to enhance the accuracy of object detection by a capacitive touch sensor.

Specifically, since a detection is performed on the basis of the differential signal (Vdet_a−Vdet_b) between the detection signal Vdet_a obtained in the first period and the detection signal Vdet_b obtained in the second period, the effect as mentioned above can be obtained.

In addition, since the first period and the second period are set alternately at a time ratio of 1 to 1, noise detection is performed frequently as compared with the case shown in FIGS. 15A, 15B described below. Thus, the noise detection accuracy becomes higher to achieve improved detection accuracy.

It should be noted that as shown in, for example, FIG. 15A (corresponding to FIG. 11A) and FIG. 15B (corresponding to FIG. 11B), the first period and the second period may be set alternately at a time ratio of x(x: an integer not smaller than 2) to 1. Then, the example shown in FIGS. 15A, 15B is configured such that a sequential drive is performed with respect to the position detection drive line L1 within the first period, that is, the first period is made up of a plurality of (in this example, x) horizontal periods. In the case of this configuration, position detection can be performed on the basis of detection results in the plurality of horizontal periods, thereby making it possible to improve the accuracy of position detection as compared with the case shown in FIGS. 11A, 11B mentioned above.

In addition, detection modes may be switchable between the detection mode (first detection mode) shown in FIGS. 11A, 11B, and the detection mode (second detection mode) shown in FIGS. 15A, 15B. In the case of this configuration, it is possible to make adjustments as appropriate, such as which one of an improvement in noise detection accuracy (first detection mode) and an improvement in position detection accuracy (second detection mode) is to be emphasized in accordance with the usage condition or application.

2. Second Embodiment

Next, a second embodiment of the present invention will be described. Unlike in the case of the above-mentioned first embodiment, in this embodiment, a liquid crystal element of a transverse electric field mode is used as a display element.

[Example of Configuration of Display Device 1B]

Figure 17A:
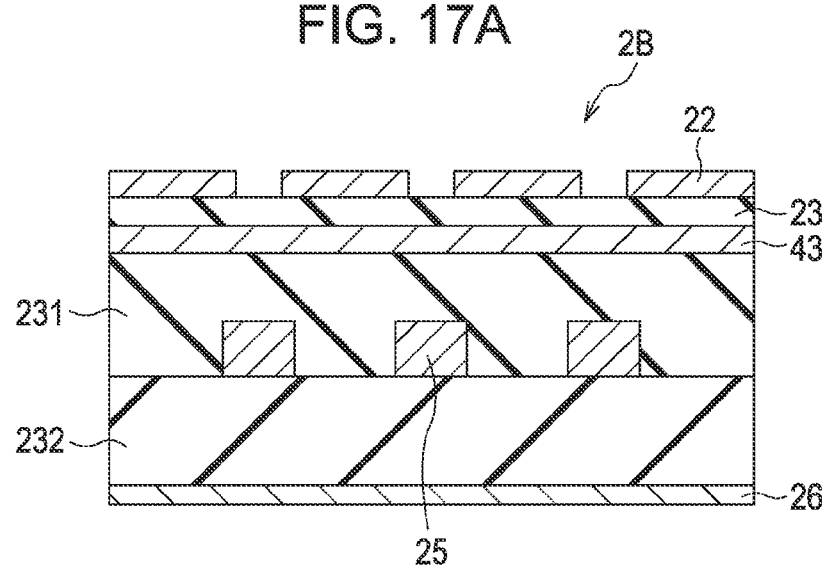
FIGS. 17A and 17B are respectively a cross-sectional view and a plan view showing the detailed configuration of a part of a pixel substrate in the display device shown in FIG. 16.
Figure 17B:
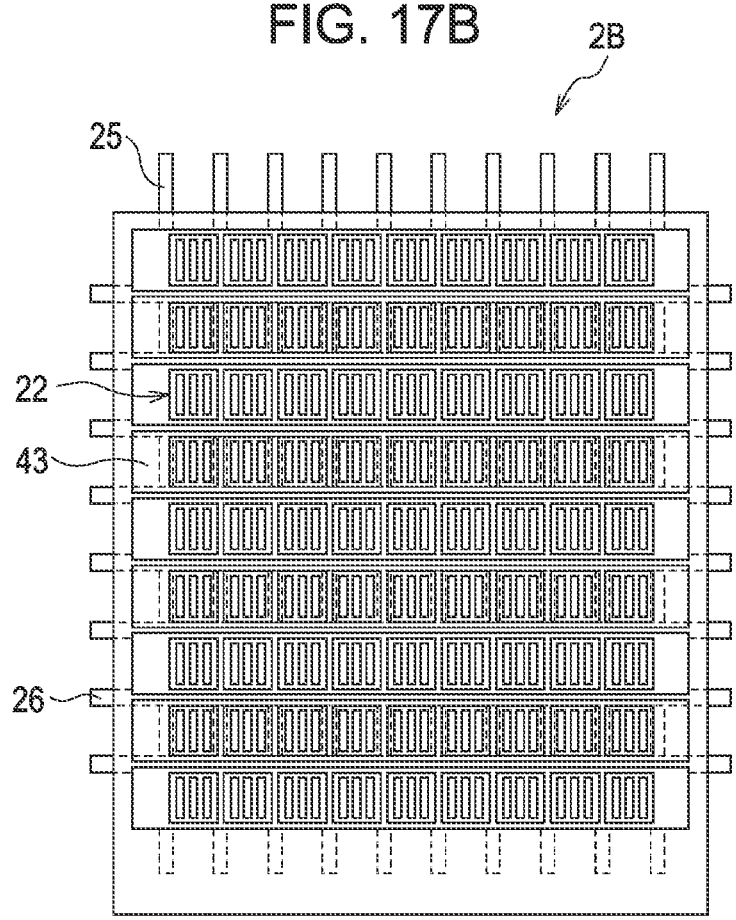

FIG. 16 shows the cross-sectional structure of the main portion of a display device 1B with a touch sensor according to this embodiment. FIGS. 17A and 17B show the detailed configuration of a pixel substrate (pixel substrate 2B described later) in the display device 1B, of which FIG. 17A shows a cross-sectional configuration, and FIG. 17B shows a plan configuration. FIGS. 18A and 18B show the perspective structure of the display device 1B. It should be noted that in these drawings, portions that are the same as those in the first embodiment mentioned above are denoted by the same reference numerals, and description thereof is omitted as appropriate.

The display device 1B according to this embodiment includes a pixel substrate 2B, a counter substrate 4B opposed to the pixel substrate 2B, and a liquid crystal layer 6 inserted between the pixel substrate 2B and the counter substrate 4B.

The pixel substrate 2B has a TFT substrate 21, a common electrode 43 disposed on the TFT substrate 21, and a plurality of pixel electrodes 22 disposed in matrix on the common electrode 43 via an insulating film 23. In addition to display drivers and TFTs (not shown) for driving the individual pixel electrodes 22, wires such as signal wires (source wires) 25 for supplying image signals to the individual pixel electrodes via insulating layers 231, 232, and gate wires 26 for driving individual TFTs are formed on the TFT substrate 21 (FIG. 17). A detection circuit 8 (FIG. 8) that performs a touch detection is also formed on the TFT substrate 21. The common electrode 43 also doubles as a sensor drive electrode constituting a part of the touch sensor for performing a touch detection, and corresponds to the drive electrode E1 shown in FIG. 1A.

The counter substrate 4B has a glass substrate 41, and a color filter 42 formed on one surface of the glass substrate 41. A sensor detection electrode 44 is formed on the other surface of the glass substrate 41. Further, a polarizing plate 45 is disposed on the sensor detection electrode 44. The sensor detection electrode 44 constitutes a part of the touch sensor, and corresponds to the detection electrode E2 shown in FIG. 1A. As shown in FIG. 5, the sensor detection electrode 44 is split into a plurality of electrode patterns. The sensor detection electrode 44 may be formed directly on the counter substrate 4B by a thin film process, or may be indirectly formed. In this case, the touch detection electrode 44 may be formed on a film base (not shown), and this film base with the touch detection electrode 44 formed thereon may be affixed to the surface of the counter substrate 4B. In this case, it is also possible to affix the film base not only between the glass and the polarizing plate but to the upper surface of the polarizing plate, and further, the film base may be formed within a film constituting the polarizing plate.

A common drive signal Vcom having an AC rectangular waveform is applied from the TFT substrate 21 to the common electrode 43. While this common drive signal Vcom defines the display voltage of each pixel together with a pixel voltage applied to each of the pixel electrodes 22, the common drive signal Vcom also doubles as a drive signal for the touch sensor, and corresponds to the AC rectangular wave Sg supplied from the drive signal source S shown in FIGS. 1A and 1B.

The liquid crystal layer 6 modulates light passing through the liquid crystal layer 6 in accordance with the state of the electric field. For example, a liquid crystal of a transverse electric field mode such as an FFS (Fringe Field Switching) mode or an IPS (In-plane Switching) mode is used for the liquid crystal layer 6.

The common electrode 43 in the pixel substrate 2B and the sensor detection electrode 44 in the counter substrate 4B are both of the same configuration as those shown in FIG. 5, for example. Both the electrodes are formed as a plurality of electrode patterns extending so as to cross each other.

Now, referring to FIGS. 18A and 18B, a more detailed description will be given in this regard. In the liquid crystal element of the FFS mode in this example, each of the pixel electrodes 22 patterned in a comb-teeth form is disposed on the common electrode 43 formed on the pixel substrate 2B, via an insulating layer 23. An alignment film 26 is formed so as to cover the pixel electrode 22. The liquid crystal layer 6 is sandwiched between the alignment film 26 and an alignment film 46 on the counter substrate 4B side. Two polarizing plates 24, 45 are disposed in a crossed Nicol state. The rubbing direction of the two alignment films 26, 46 coincides with the transmission axis of one of the two polarizing plates 24, 45. This example illustrates a case in which the rubbing direction coincides with the transmission axis of the polarizing plate 45 on the emission side. Further, the rubbing direction of the two alignment films 26, 46, and the direction of the transmission axis of the polarizing plate 45 are set substantially parallel to the direction of extension (the longitudinal direction of the comb teeth) of the pixel electrode 22 within a range in which the direction in which liquid crystal molecules rotate is regulated.

[Operation/Effect of Display Device 1B]

Next, the operation and effect of the display device 1B according to this embodiment will be described.

Figure 19A:
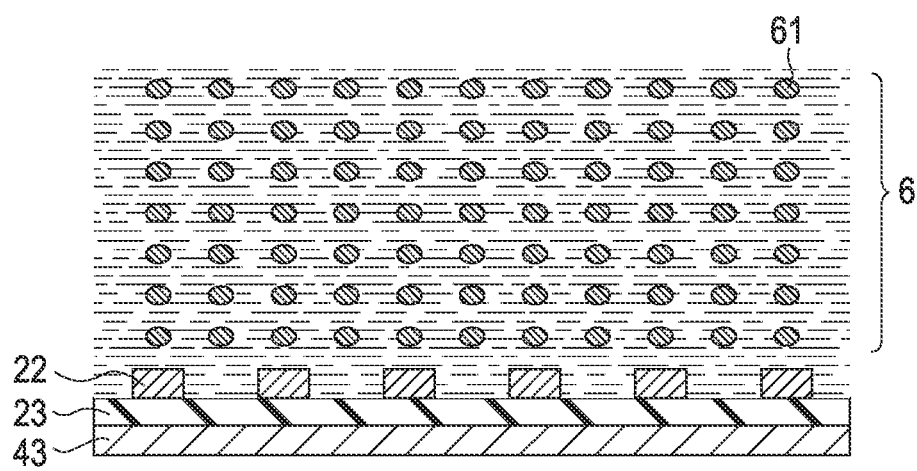
FIGS. 19A and 19B are cross-sectional views for explaining the operation of the display device shown in FIG. 16.
Figure 19B:
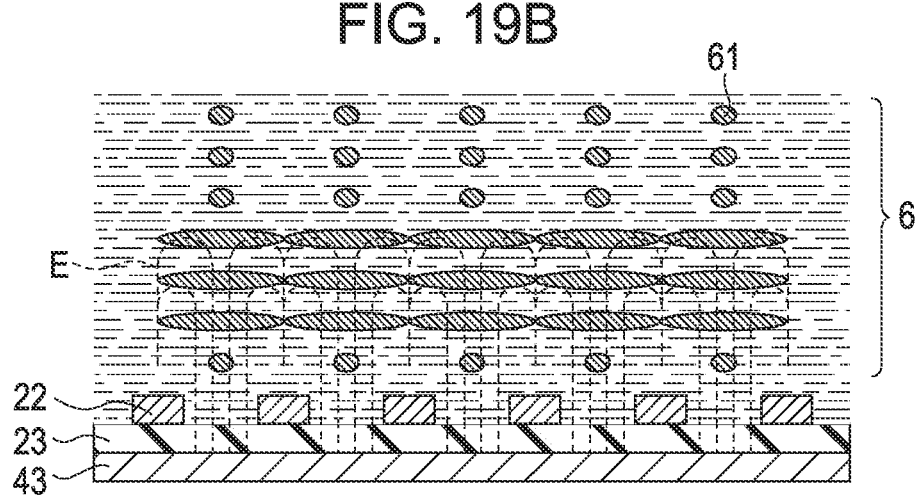

First, referring to FIGS. 18A and 18B and FIGS. 19A and 19B, a brief description will be given of the principle of display of a liquid crystal element in the FFS mode. Here, FIGS. 19A and 19B show an enlarged cross section of the main portion of a liquid crystal element. In these drawings, FIGS. 19A and 19B shows the state of a liquid crystal element when an electric field is not applied, and when an electric field is applied, respectively.

In a state when no voltage is applied between the common electrode 43 and the pixel electrodes 22 (FIGS. 18A, 19A), the axis of liquid crystal molecules 61 forming the liquid crystal layer 6 is orthogonal to the transmission axis of the polarizing plate 24 on the incidence side, and is parallel to the transmission axis of the polarizing plate 45 on the emission side. Thus, incident light h having passed through the polarizing plate 24 on the incidence side reaches the polarizing plate 45 on the emission side without being subject to any phase difference within the liquid crystal layer 6, and is absorbed by the polarizing plate 45, thus creating a black display. On the other hand, in a state when a voltage is applied between the common electrode 43 and the pixel electrodes 22 (FIGS. 18B, 19B), the alignment direction of the liquid crystal molecules 61 is rotated obliquely with respect to the direction of extension of the pixel electrodes 22 by a transverse electric field E generated between the pixel electrodes. At this time, the field strength at the time of white display is optimized so that the liquid crystal molecules 61 located at the center in the thickness direction of the liquid crystal layer 6 are rotated by approximately 45 degrees. Consequently, as the incident light h having passed through the polarizing plate 24 on the incidence side passes through the liquid crystal layer 6, the incident light h is subject to a phase difference, and becomes linearly polarized light rotated by 90 degrees, before passing through the polarizing plate 45 on the emission side, thus creating a white display.

Next, a display control and a touch detection in the display device 1B will be described. Sine these operations are the same as the operations in the first embodiment mentioned above, description thereof is omitted as appropriate.

A display driver (not shown) on the pixel substrate 2B supplies the common drive signal Vcom in a line sequential manner to each of the electrode patterns of the common electrode 43. This display driver also supplies pixel signals (image signals) to the pixel electrodes 22 via the source wires 25, and in synchronization with this, controls the switching of the TFTs of the pixel electrodes via the gate wires 26 in a line sequential manner. Thus, an electric field in the transverse direction (direction parallel to the substrate) determined by the common drive signal Vcom and each image signal is applied to the liquid crystal layer 6 for each pixel, thereby modulating the liquid crystal state. In this way, display by the so-called inversion drive is performed.

On the other hand, on the side of the counter substrate 4B, the common drive signal Vcom is sequentially applied in a time division manner to each of the electrode patterns of the common electrode 43. That is, charging and discharging are performed with respect to each of a row of capacitors C11 to C1n formed at the intersections between the electrode pattern of the common electrode 43 to which the common drive signal Vcom has been applied, and the individual electrode patterns of the sensor detection electrode 44. Then, a detection signal Vdet of a magnitude varying with the capacitance value of the capacitor C1 is outputted from each of the electrode patterns of the sensor detection electrode 44. In a state when a user's finger is not in touch with the surface of the counter substrate 4B, the magnitude of this detection signal Vdet is substantially constant. When a user's finger touches any one of locations on the surface of the counter substrate 4B, the capacitor C2 due to the finger is added to the capacitor C1 originally formed at the touch location. As a result, the detection signal Vdet at the time when the touch location is scanned becomes smaller in value than at other locations. The detection circuit 8 (FIG. 8) compares this detection signal Vdet with the threshold voltage Vth, and determines the location concerned to be a touch location if the detection signal Vdet is less than the threshold voltage Vth. This touch location can be calculated from the application timing of the common drive signal Vcom, and the detection timing of the detection signal Vdet less than the threshold voltage Vth.

As described above, in this embodiment, as in the first embodiment mentioned above, a capacitive touch sensor is configured such that the common electrode 43 originally provided to the liquid crystal display element doubles as one of a pair of touch sensor electrodes including a drive electrode and a detection electrode, and the common drive signal Vcom as a display drive signal is also used as a touch sensor drive signal. Thus, it is necessary to additionally provide only the sensor detection electrode 44, and it is unnecessary to prepare a touch sensor drive signal. Therefore, the configuration is simple.

In this embodiment as well, the detection circuit 8 described above with reference to the first embodiment is provided. Thus, it is possible to attain the same effect through the same operation as that in the first embodiment mentioned above. That is, it is possible to enhance the accuracy of object detection in a display device including a capacitive touch sensor without using a shield layer, for example.

In particular, this embodiment has a structure in which the common electrode 43 as a touch sensor drive electrode is provided on the pixel substrate 2B side (on top of the TFT substrate 21). Thus, supply of the common drive signal Vcom from the TFT substrate 21 to the common electrode 43 is extremely easy. In addition, necessary circuits, electrode patterns, wires, and the like can be concentrated in the pixel substrate 2, allowing for greater circuit integration. Therefore, the supply path (contact conductive column 7) for the common drive signal Vcom from the pixel substrate 2 side to the counter substrate 4 side, which is necessary in the first embodiment mentioned above, becomes unnecessary, thereby achieving simplification in structure.

In addition, as mentioned above, the common electrode 43 as a touch sensor drive electrode is provided on the pixel substrate 2B side, and the source wires 25 and the gate wires 26 are also provided on the pixel substrate 2B. Thus, the structure according to this embodiment is particularly susceptible to the influence of the internal noise described above. For this reason, it can be said that the advantage of performing a detection by removing the influence of such internal noise is particularly great in the case of the display device 1B according to this embodiment.

While the detection circuit 8 (FIG. 8) may be formed in a peripheral region (non-display region or rim region) on the counter substrate 4B, it is preferable to form the detection circuit 8 in a peripheral region on the pixel substrate 2B. This is because forming the detection circuit 8 on the pixel substrate 2B makes it possible to achieve integration with various circuit elements and the like for display control which are originally formed on the pixel substrate 2B.

Modifications of Second Embodiment

While in this embodiment the sensor detection electrode 44 is provided on the front surface side (the side opposite to the liquid crystal layer 6) of the glass substrate 41, the following modifications are possible.

For example, as in a display device 1C shown in FIG. 20, in a counter substrate 4C, the sensor detection electrode 44 may be provided on the liquid crystal layer 6 side with respect to the color filter 42.

Figure 21:
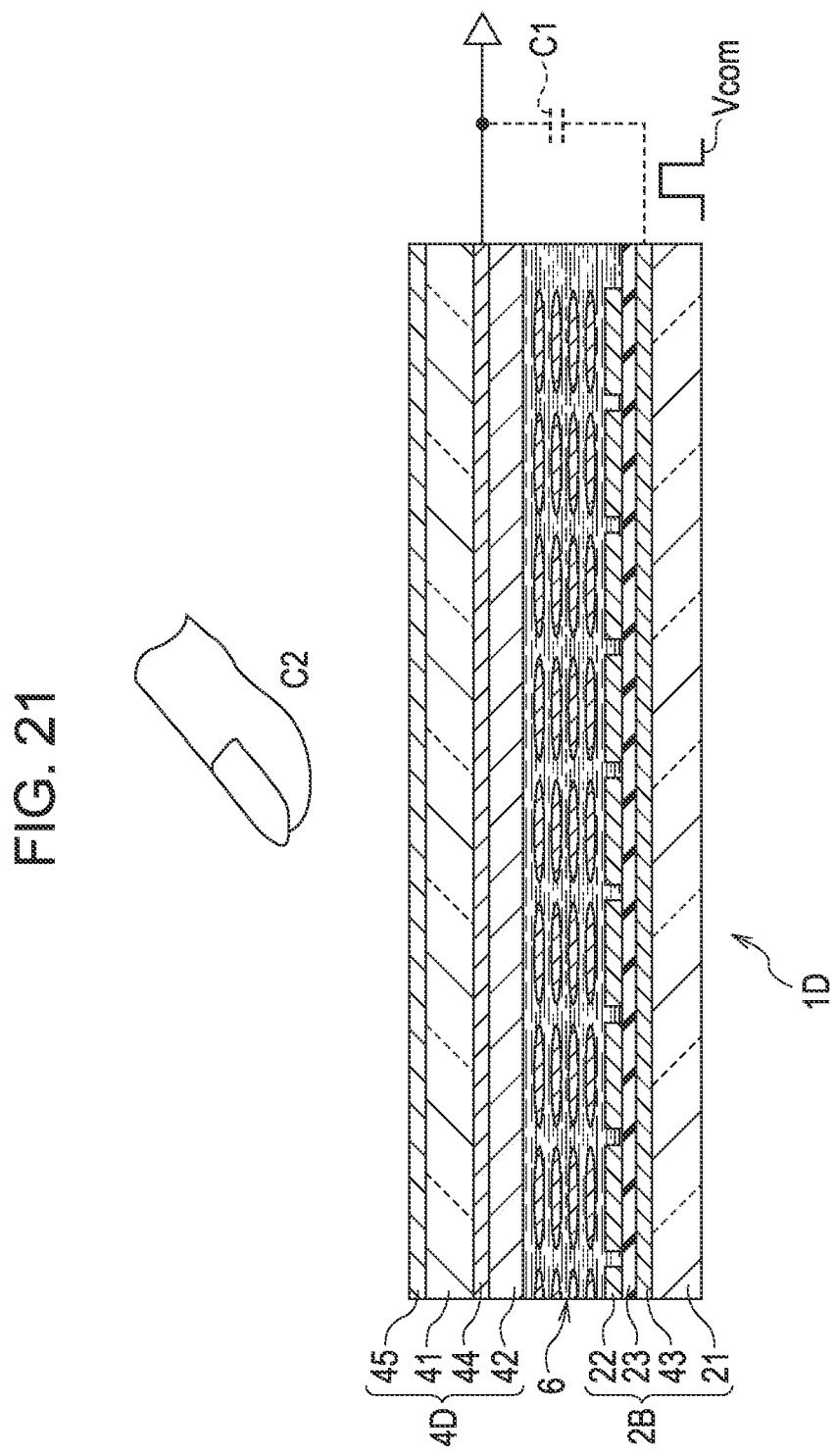
FIG. 21 is a cross-sectional view showing the schematic cross-sectional structure of a display device with a touch sensor according to another modification of the second embodiment.

Alternatively, as in a display device 1D shown in FIG. 21, in a counter substrate 4D, the sensor detection electrode 44 may be provided between the glass substrate 41 and the color filter 42. In this regard, in the case of the transverse electric field mode, when there are electrodes in the vertical direction, an electric field is applied in the vertical direction to cause liquid crystals to rise, resulting in significant deterioration in view angle or the like. Therefore, when the sensor detection electrode 44 is arranged via a dielectric such as the color filter 42 or the like, this problem can be significantly reduced.

3. Applications

Next, referring to FIGS. 22 to 26G, a description will be given of applications of the display device with a touch sensor described with reference to the embodiments and modifications mentioned above. The display device according to each of the above-mentioned embodiments and the like can be applied to an electronic apparatus in all fields, including a television apparatus, a digital camera, a notebook personal computer, a portable terminal apparatus such as a portable telephone, or a video camera. In other words, the display device according to each of the above-mentioned embodiments and the like can be applied to an electronic apparatus in all fields in which an externally inputted picture signal or an internally generated picture signal is displayed as an image or picture.

Application 1

Figure 22:
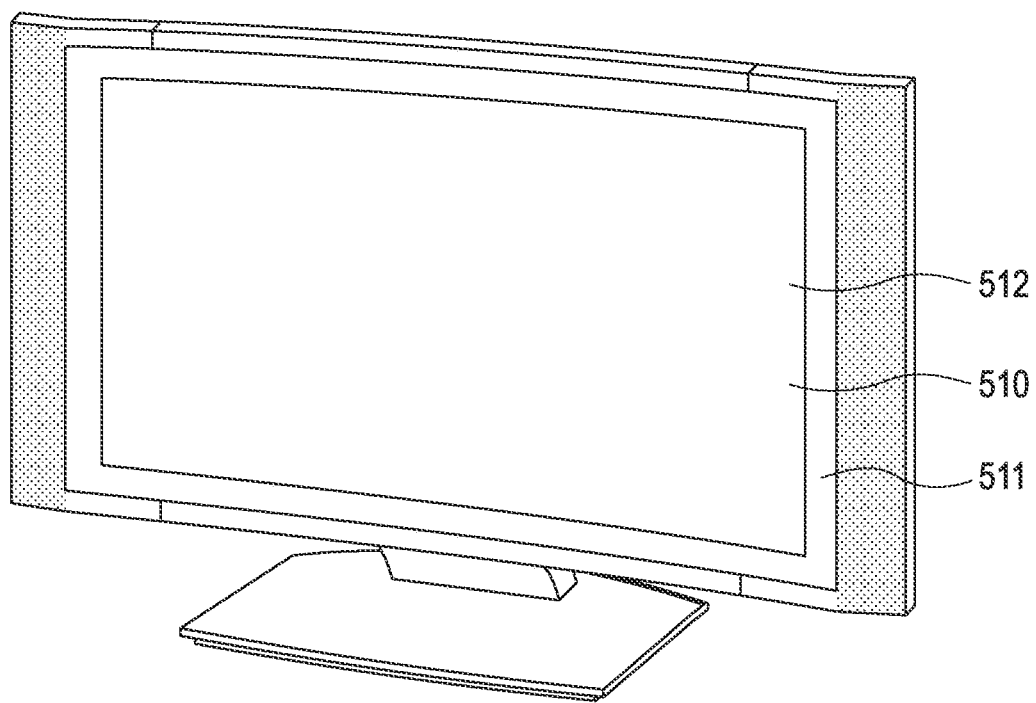

FIG. 22 shows the outward appearance of a television apparatus to which the display device according to each of the embodiments and the like mentioned above is applied. This television apparatus has, for example, a picture display screen section 510 including a front panel 511 and a filter glass 512. This picture display screen section 510 is formed by the display device according to each of the embodiments and the like mentioned above.

Application 2

Figure 23A:
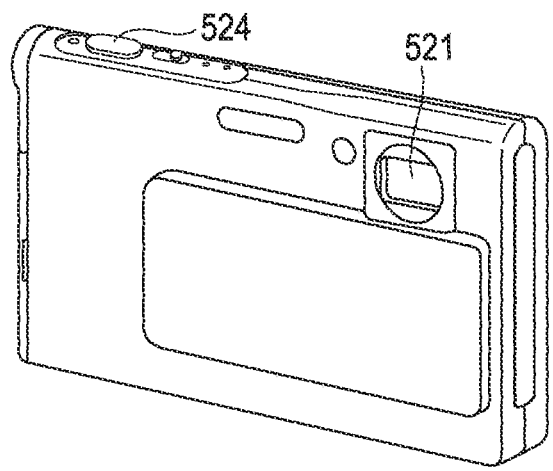
FIGS. 23A and 23B are a perspective view as seen from the front side and a perspective view as seen from the back side, respectively, of Application 2.
Figure 23B:
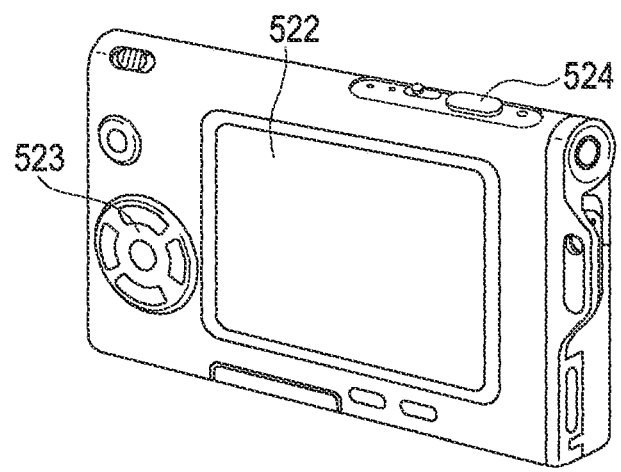

FIGS. 23A and 23B show the outward appearance of a digital camera to which the display device according to each of the embodiments and the like mentioned above is applied. This digital camera has, for example, a light emitting section 521 for flashlight, a display section 522, a menu switch 523, and a shutter button 524. The display section 522 is formed by the display device according to each of the embodiments and the like mentioned above.

Application 3

Figure 24:
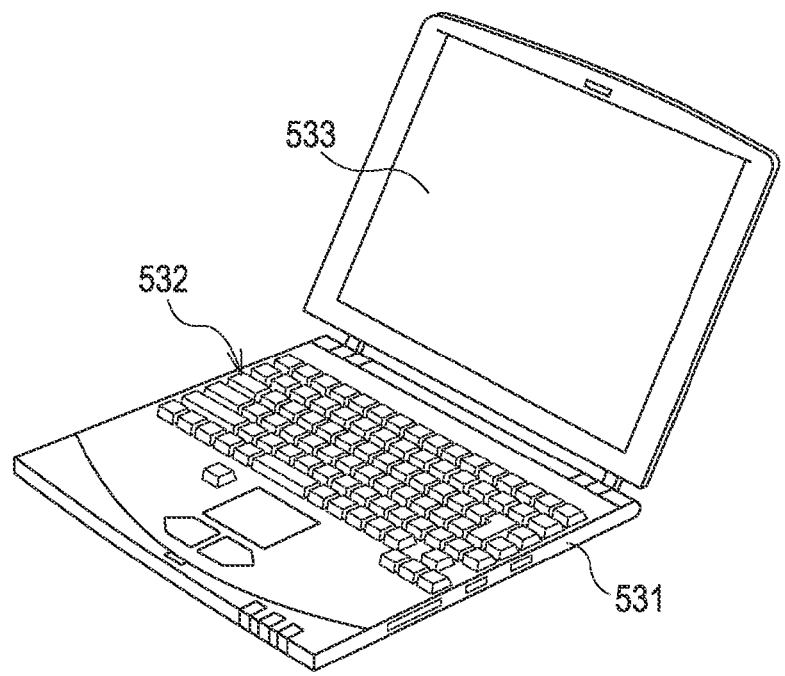
FIG. 24 is a perspective view showing the outward appearance of Application 3.

FIG. 24 shows the outward appearance of a notebook personal computer to which the display device according to each of the embodiments and the like mentioned above is applied. This notebook personal computer has, for example, a main body 531, a keyboard 532 for making an input operation of characters or the like, and a display section 533 for displaying an image. The display section 533 is formed by the display device according to each of the embodiments and the like mentioned above.

Application 4

Figure 25:
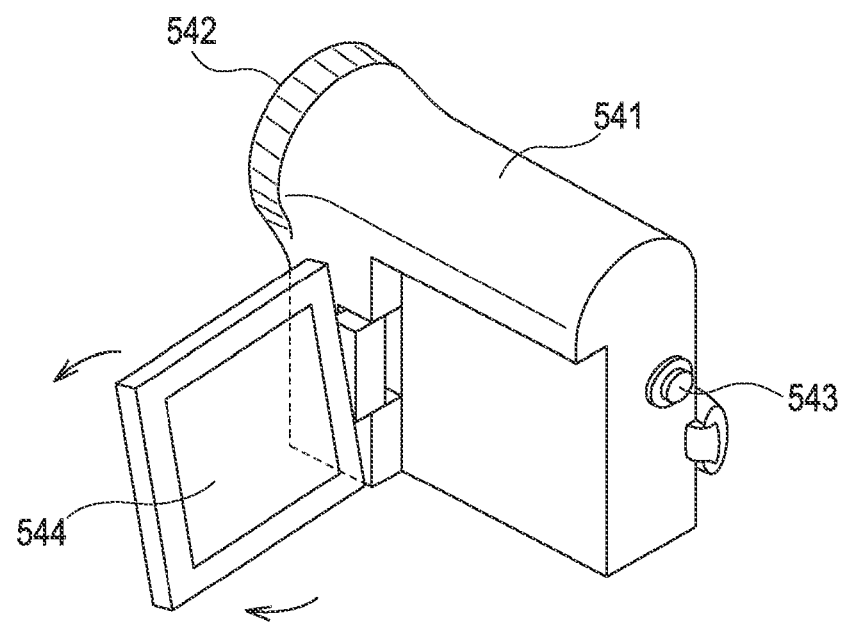
FIG. 25 is a perspective view showing the outward appearance of Application 4.

FIG. 25 shows the outward appearance of a video camera to which the display device according to each of the embodiments and the like mentioned above is applied. This video camera has, for example, a main body section 541, a lens 542 for shooting a subject which is provided on the front side surface of the main body section 541, a start/stop switch 543 to be operated when shooting, and a display section 544. The display section 544 is formed by the display device according to each of the embodiments and the like mentioned above.

Application 5

FIGS. 26A to 26G show the outward appearance of a portable telephone to which the display device according to each of the embodiments and the like mentioned above is applied. This portable telephone is formed by coupling an upper housing 710 and a lower housing 720 together by a coupling section (hinge) 730, and has a display 740, a sub-display 750, a picture light 760, and a camera 770. The display 740 or the sub-display 750 is formed by the display device according to each of the embodiments and the like mentioned above.

4. Other Modification

While the present invention has been described above by way of several embodiments, modifications, and applications, the present invention is not limited to these embodiments and the like but various modifications are possible.

Figure 27A:
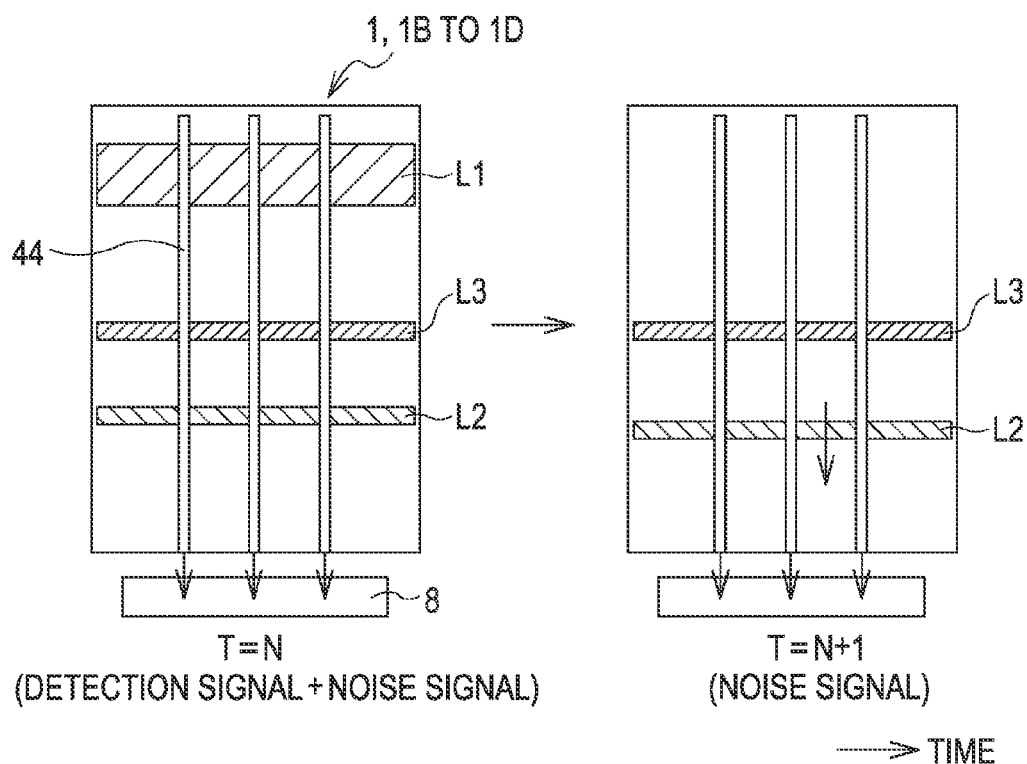
FIGS. 27A and 27B are timing diagrams for explaining an internal noise removal method according to a modification of an embodiment of the present invention.
Figure 27B:
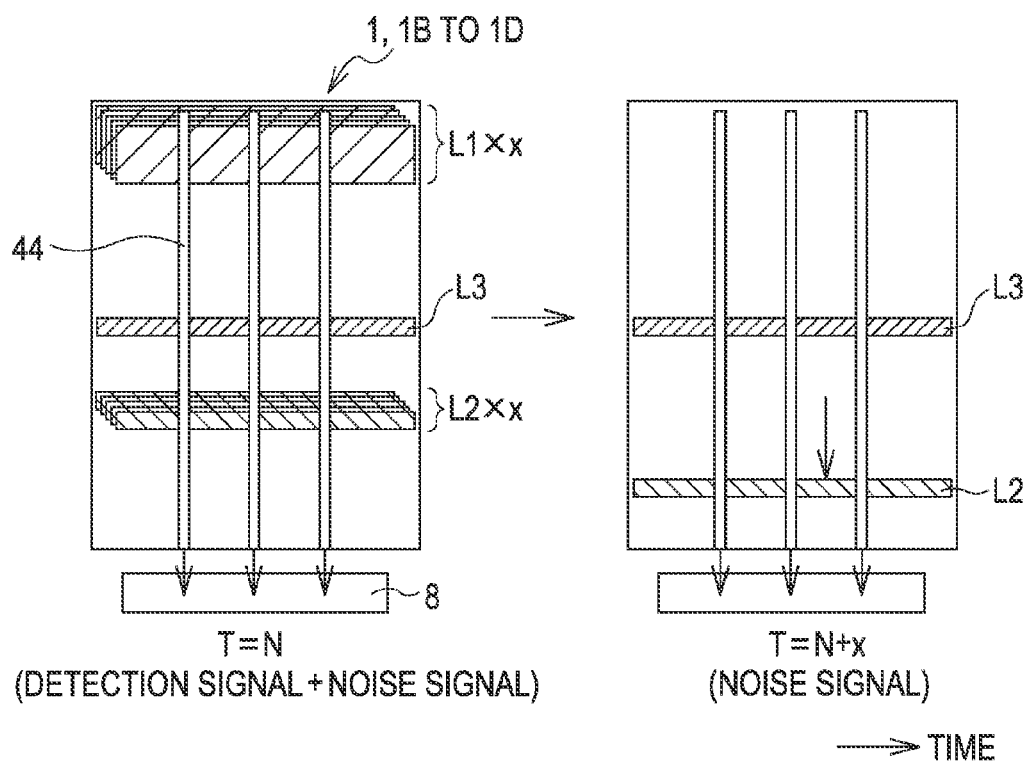

For example, the above-mentioned embodiments and the like are directed to the case in which in the first and second periods, the display drive line L2 is also used as (made common with) the noise detection line. However, for example, the configuration shown in FIGS. 27A and 27B may be employed. That is, in the first and second periods, the display drive line L2 and a noise detection line L3 may be separately provided. However, it can be said that making those lines common (double as each other) as in the above-mentioned embodiments and the like is more preferable because the circuit configuration and the control method are simplified.

In addition, for example, the position detection drive line L1 and the display drive line L2 (first drive line) in the first period, and the display drive line L2 (second drive line) in the second period may be located on substantially the same horizontal line within the common electrode 43. In the case of this configuration, the difference between internal noises obtained in substantially the same pixel regions within the common electrode 43 is taken and removed, thereby avoiding location dependence to achieve improved noise detection accuracy.

Further, while the above-mentioned second embodiment is directed to a liquid crystal element of the FFS mode as an example of transverse electric field mode, the present invention can be similarly applied to a liquid crystal of the IPS mode.

In addition, the above-mentioned embodiments and the like are directed to the display device using a liquid crystal display element as a display element, the present invention is also applicable to display devices using other display elements, for example, an organic EL element.

Figure 28:
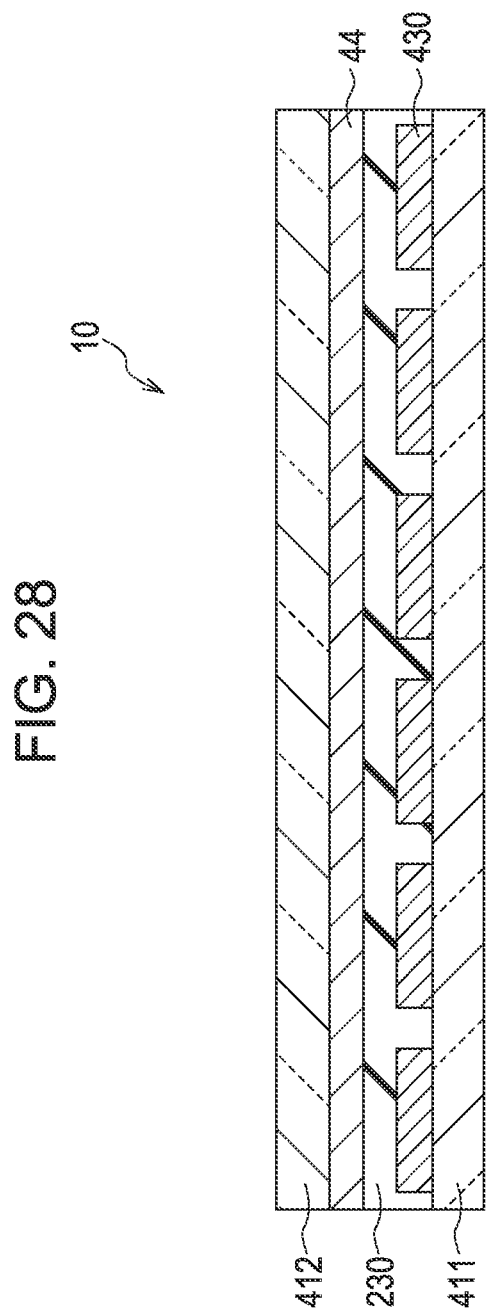
FIG. 28 is a cross-sectional view showing the main-portion configuration of a touch sensor according to another modification of an embodiment of the present invention.
Figure 29:
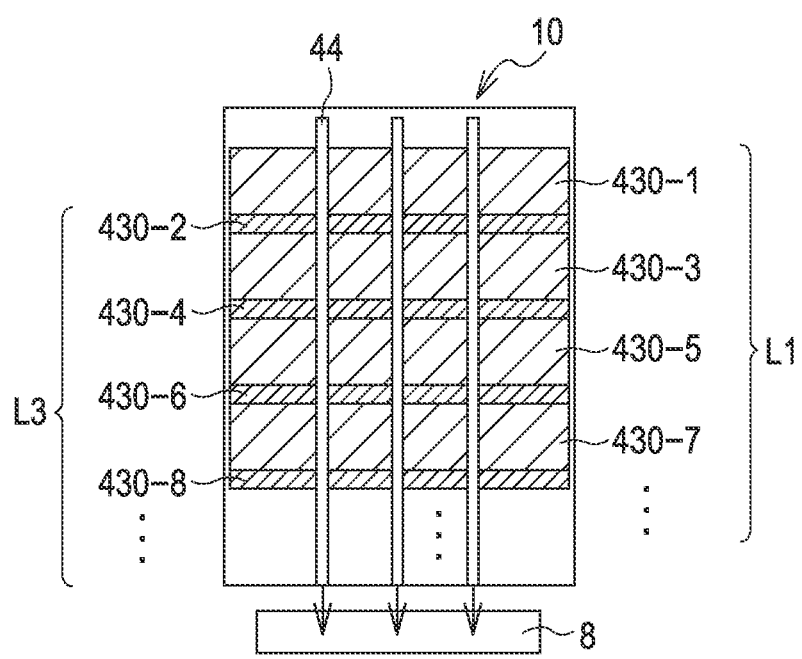
FIG. 29 is a schematic diagram showing an example of drive lines in the touch sensor shown in FIG. 28.

In addition, the above-mentioned embodiments and the like are directed to a case in which a touch sensor is built in a display device (a display device with a touch sensor). However, the touch sensor according to an embodiment of the present invention is not limited to this case. For example, the touch sensor may be applied to the outer side of the display device (exterior touch sensor). Specifically, for example, a touch sensor 10 as shown in FIG. 28 may be provided on the outer side of the display device. The touch sensor 10 includes, for example, a pair of insulating substrates 411, 412 made of glass or the like, a sensor drive electrode (touch drive electrode) 430 formed between these substrates, a sensor detection electrode 44, and an insulating layer 230. The sensor drive electrode 430 is formed on the insulating substrate 411, and is applied with a drive signal for the touch sensor. The sensor detection electrode 44 is formed on the insulating substrate 412. As in the above-mentioned embodiments and the like, the sensor detection electrode 44 is an electrode for obtaining a detection signal Vdet. The insulating layer 230 is formed between the sensor drive electrode 430 and the sensor detection electrode 44. It should be noted that the perspective structure of the touch sensor 10 is the same as that according to the above-mentioned embodiments and the like shown in FIG. 5 and the like, for example. In addition, the circuit configurations and the like of the drive signal source S, the detection circuit 8, and the timing control section 9 are also the same as those in the above-mentioned embodiments and the like shown in FIG. 8. In the touch sensor 10 configured as described above, for example, a position detection drive line L1 and a noise detection drive line L3 as shown in FIG. 29 may be employed. That is, the position detection drive line L1 and the noise detection drive line L3 may be formed from unitary common electrodes, such as common electrodes 430-1, 430-3, 430-5, 430-7, and the like, and 430-2, 430-4, 430-6, 430-8, and the like. Although the touch sensor 10 configured as described above may not necessarily be provided with the noise detection drive line L3, it is preferable that the noise detection drive line L3 be provided from the viewpoint of improved detection accuracy or the like.

Furthermore, the series of processes described above with reference to the above-mentioned embodiments and the like can be either executed by hardware or executed by software. If the series of processes is to be executed by software, a program constituting the software is installed into a general purpose personal computer or the like. Such a program may be pre-recorded on a recording medium built in the computer.

In accordance with the touch sensor, the display device, and the electronic apparatus according to an embodiment of the present invention, the contact or proximity position of an object is detected on the basis of the detection signal obtained from the touch detection electrode in response to a change in electrostatic capacitance. In addition, the touch detection circuit performs a detection on the basis of the first detection signal obtained from the first drive line formed in the first period, and the second detection signal obtained from the second drive line having a line width smaller than the line width of the first drive line. Thus, a detection can be performed while reducing the influence of the internal noise mentioned above, for example, without using a shield layer as in the related art. Therefore, it is possible to improve the accuracy of object detection in a capacitive touch sensor.

It should be understood by those skilled in the art that various modifications, combinations, sub-combinations and alterations may occur depending on design requirements and other factors insofar as they are within the scope of the appended claims or the equivalents thereof.

What is claimed is:

1. A touch sensor comprising:
    a sensor electrode having an electrostatic capacitance for touch detection;
    a touch detection circuit that performs a detection of a contact or proximity position of an object, on the basis of a detection signal obtained from the sensor electrode by applying a touch sensor drive signal to the sensor electrode,
    wherein the sensor electrode is split into a plurality of electrode patterns in a stripe shape, and application of the touch sensor drive signal to part of the plurality of electrode patterns causes a drive line to be formed at that time,
    the touch detection circuit performs the detection on the basis of a first detection signal obtained from a first drive line formed in a first period, and a second detection signal obtained from a second drive line formed in a second period different from the first period, and
    the touch detection circuit performs the detection on the basis of a differential signal between the first detection signal and the second detection signal.

2. The touch sensor according to claim 1, wherein the first period and the second period are set alternately at a time ratio of 1 to 1.

3. The touch sensor according to claim 1, wherein:
    the first period and the second period are set alternately at a time ratio of n (n: an integer not smaller than 2) to 1;
    the first drive line includes a position detection drive line; and
    within the first period, a sequential drive is performed with respect to the position detection drive line.

4. The touch sensor according to claim 3, wherein the first drive line includes the position detection drive line and a noise detection drive line having a line width equal to the line width of the second drive line.

5. The touch sensor according to claim 1, wherein:
    detection modes can be switched between a first detection mode and a second detection mode;
    the first detection mode is a mode in which the first period and the second period are set alternately at a time ratio of 1 to 1; and
    the second detection mode is a mode in which the first period and the second period are set alternately at a time ratio of n (n: an integer not smaller than 2) to 1, the first drive line includes a position detection drive line, and a sequential drive is performed with respect to the position detection drive line within the first period.

6. The touch sensor according to claim 5, wherein the first drive line includes the position detection drive line and a noise detection drive line having a line width equal to the line width of the second drive line.

7. The touch sensor according to claim 1, wherein:
    the first period and the second period are set alternately in a time division manner;
    the first drive line includes a position detection drive line; and
    the position detection drive line is set at arbitrary positions within the sensor electrode which differ from each other between the first period and the second period.

8. The touch sensor according to claim 7, wherein the first drive line includes the position detection drive line and a noise detection drive line having a line width equal to the line width of the second drive line.

9. The touch sensor according to claim 1, wherein the first drive line in the first period, and the second drive line in the second period are located on substantially the same line within the sensor electrode.

10. A display device comprising:
    a plurality of display pixel electrodes;
    a display function layer having an image display function;
    a display control circuit that controls image display on the basis of an image signal so as to apply a display drive voltage to the display pixel electrodes and to cause the display function layer to exert the image display function, on the basis of an image signal;
    a sensor electrode having an electrostatic capacitance for touch detection; and
    a touch detection circuit that performs a detection of a contact or proximity position of an object, on the basis of a detection signal obtained from the sensor electrode, by using the display drive voltage applied to the sensor electrode by the display control circuit as a touch sensor drive signal,
    wherein the sensor electrode is split into a plurality of electrode patterns in a stripe shape, and application of the touch sensor drive signal to part of the plurality of electrode patterns causes a drive line to be formed at that time,
    the touch detection circuit performs the detection on the basis of a first detection signal obtained from a first drive line formed in a first period, and a second detection signal obtained from a second drive line formed in a second period different from the first period, and
    the touch detection circuit performs the detection on the basis of a differential signal between the first detection signal and the second detection signal.

11. The display device according to claim 10, wherein:
    the first drive line includes a position detection drive line and a noise detection drive line having a line width equal to the line width of the second drive line; and
    the noise detection drive line and the second drive line are each made common with an image display drive line for performing image display by the display control circuit.

12. The display device according to claim 10, wherein the display control circuit performs a sequential drive with respect to the drive line formed as a batch of two or more electrode patterns of the plurality of electrode patterns.

13. The display device according to claim 10, further comprising:
    a circuit board on which the display control circuit is formed; and a counter substrate disposed in opposition to the circuit board, wherein the display pixel electrodes are disposed on a side of the circuit board close to the counter substrate, and the display function layer is inserted between the display pixel electrodes on the circuit board.

14. The display device according to claim 13, wherein the display function layer is a liquid crystal layer.

15. The display device according to claim 10, further comprising:
a circuit board on which the display control circuit is formed; and
a counter substrate disposed in opposition to the circuit board,
wherein the display pixel electrodes are laminated on the circuit board via an insulating layer, and
the display function layer is inserted between the display pixel electrodes on the circuit board, and the counter substrate.

16. The display device according to claim 15, wherein the display function layer is a liquid crystal layer, and performs liquid crystal display in a transverse electric field mode.

17. An electronic apparatus comprising a display device with a touch sensor, the display device including:
a plurality of display pixel electrodes;
a display function layer having an image display function;
a display control circuit that controls image display on the basis of an image signal so as to apply a display drive voltage to the display pixel electrodes to cause the display function layer to exert the image display function, on the basis of an image signal;
a sensor electrode having an electrostatic capacitance for touch detection; and
a touch detection circuit that performs a detection of a contact or proximity position of an object, on the basis of a detection signal obtained from the sensor electrode, by using the display drive voltage applied to the sensor electrode by the display control circuit as a touch sensor drive signal,
wherein the sensor electrode is split into a plurality of electrode patterns in a stripe shape, and application of the touch sensor drive signal to part of the plurality of electrode patterns causes a drive line to be formed at that time,
the touch detection circuit performs the detection on the basis of a first detection signal obtained from a first drive line formed in a first period, and a second detection signal obtained from a second drive line formed in a second period different from the first period and having a smaller line width than the first drive line, and
the touch detection circuit performs the detection on the basis of a differential signal between the first detection signal and the second detection signal.

18. The electronic apparatus according to claim 17, wherein:
the first drive line includes a position detection drive line and a noise detection drive line having a line width equal to the line width of the second drive line; and
the noise detection drive line and the second drive line are each made common with an image display drive line for performing image display by the display control circuit.

19. The electronic apparatus according to claim 17, wherein the display control circuit performs a sequential drive with respect to the drive line formed as a batch of two or more electrode patterns of the plurality of electrode patterns.

20. The electronic apparatus according to claim 17, wherein:
the first period and the second period are set alternately in a time division manner;
the first drive line includes a position detection drive line; and
the position detection drive line is set at arbitrary positions within the sensor electrode which differ from each other between the first period and the second period.

* * * * *